(12) United States Patent
Haramati et al.

(10) Patent No.: US 11,587,039 B2
(45) Date of Patent: Feb. 21, 2023

(54) DIGITAL PROCESSING SYSTEMS AND METHODS FOR COMMUNICATIONS TRIGGERING TABLE ENTRIES IN COLLABORATIVE WORK SYSTEMS

(71) Applicant: MONDAY.COM LTD., Tel Aviv (IL)

(72) Inventors: Tal Haramati, Tel Aviv (IL); Moshik Eilon, Tel Aviv (IL); Moshe Zemah, Rishon LeZion (IL); Ronen Sabag, Ashdod (IL)

(73) Assignee: Monday.com Ltd., Tel Aviv (IL)

( * ) Notice: Subject to any disclaimer, the term of this patent is extended or adjusted under 35 U.S.C. 154(b) by 0 days.

(21) Appl. No.: 17/243,725

(22) Filed: Apr. 29, 2021

(65) Prior Publication Data

US 2021/0357861 A1 Nov. 18, 2021

Related U.S. Application Data

(63) Continuation of application No. PCT/IB2021/000297, filed on Apr. 28, 2021, which is
(Continued)

(51) Int. Cl.
*G06Q 10/10* (2012.01)
*G06Q 10/06* (2012.01)
(Continued)

(52) U.S. Cl.
CPC ....... *G06Q 10/103* (2013.01); *G05B 13/0265* (2013.01); *G06F 3/0482* (2013.01);
(Continued)

(58) Field of Classification Search
CPC .............. G06Q 10/103; G06Q 10/101; G06Q 10/06312; G06Q 10/06313;
(Continued)

(56) References Cited

U.S. PATENT DOCUMENTS

| | | |
|---|---|---|
| 4,972,314 A | 11/1990 | Getzinger et al. |
| 5,220,657 A | 6/1993 | Bly et al. |

(Continued)

FOREIGN PATENT DOCUMENTS

| | | |
|---|---|---|
| CA | 2 828 011 A1 | 9/2012 |
| CN | 103064833 A | 4/2013 |

(Continued)

OTHER PUBLICATIONS

D'Elessio et al., Monday.com Walkthrough 2018\All Features, Platforms & Thoughts, Mar. 1, 2018, pp. 1-55, 2018.

(Continued)

*Primary Examiner* — Jonathan P Ouellette
(74) *Attorney, Agent, or Firm* — Finnegan, Henderson, Farabow, Garrett & Dunner LLP

(57) ABSTRACT

Systems, methods, and computer-readable media for triggering table entries characterizing workflow-related communications occurring between workflow participants are disclosed. The systems and methods may involve presenting a table via a display, the table containing rows and columns defining cells, the rows and cells being configured to manage respective roles of the workflow participants; presenting on the display at least one active link for enabling workflow participants to join in a video or an audio communication; logging in memory, characteristics of the communication including identities of the workflow participants who joined in the communication; and generating an object associated with the table, the object containing the characteristics of the communication logged in memory.

30 Claims, 21 Drawing Sheets

Related U.S. Application Data a continuation-in-part of application No. PCT/IB2020/000974, filed on Nov. 17, 2020, and a continuation-in-part of application No. PCT/IB2020/000658, filed on Aug. 7, 2020, which is a continuation-in-part of application No. PCT/IB2021/000090, filed on Feb. 11, 2021, and a continuation-in-part of application No. PCT/IB2021/000024, filed on Jan. 14, 2021.

(60) Provisional application No. 63/148,092, filed on Feb. 10, 2021, provisional application No. 63/122,439, filed on Dec. 7, 2020, provisional application No. 63/121,803, filed on Dec. 4, 2020, provisional application No. 63/078,301, filed on Sep. 14, 2020, provisional application No. 63/019,396, filed on May 3, 2020, provisional application No. 63/018,593, filed on May 1, 2020.

(51) Int. Cl.

| | |
|---|---|
| *G06Q 30/02* | (2012.01) |
| *G06Q 10/0633* | (2023.01) |
| *G06Q 10/101* | (2023.01) |
| *G06Q 10/0631* | (2023.01) |
| *G06F 16/14* | (2019.01) |
| *G06F 16/23* | (2019.01) |
| *G06F 16/25* | (2019.01) |
| *G06F 16/11* | (2019.01) |
| *H04L 67/1095* | (2022.01) |
| *G06F 3/0482* | (2013.01) |
| *G06F 3/14* | (2006.01) |
| *H04L 51/046* | (2022.01) |
| *G06F 40/279* | (2020.01) |
| *G06F 40/40* | (2020.01) |
| *G06F 40/30* | (2020.01) |
| *G06K 9/62* | (2022.01) |
| *G06F 3/04817* | (2022.01) |
| *G06F 3/16* | (2006.01) |
| *H04L 12/18* | (2006.01) |
| *G06F 16/22* | (2019.01) |
| *G06F 16/2455* | (2019.01) |
| *G06F 16/248* | (2019.01) |
| *G06F 40/177* | (2020.01) |
| *H04L 65/401* | (2022.01) |
| *G06F 40/186* | (2020.01) |
| *G06F 3/0484* | (2022.01) |
| *G06F 11/30* | (2006.01) |
| *G06F 11/34* | (2006.01) |
| *G06F 40/103* | (2020.01) |
| *G06F 3/04845* | (2022.01) |
| *G06T 11/20* | (2006.01) |
| *G06F 16/909* | (2019.01) |
| *G06F 16/9038* | (2019.01) |
| *G06F 16/9032* | (2019.01) |
| *G06F 16/901* | (2019.01) |
| *G06F 16/951* | (2019.01) |
| *G06F 16/9536* | (2019.01) |
| *G06F 16/28* | (2019.01) |
| *G06F 16/26* | (2019.01) |
| *G06F 40/253* | (2020.01) |
| *H04L 51/18* | (2022.01) |
| *G06F 16/903* | (2019.01) |
| *G06F 16/31* | (2019.01) |
| *G06F 9/54* | (2006.01) |
| *H04L 51/48* | (2022.01) |
| *G06N 20/00* | (2019.01) |
| *G06F 40/106* | (2020.01) |
| *G05B 13/02* | (2006.01) |
| *H04L 51/04* | (2022.01) |
| *B65D 83/04* | (2006.01) |

(52) U.S. Cl.
CPC ........ *G06F 3/0484* (2013.01); *G06F 3/04817* (2013.01); *G06F 3/04845* (2013.01); *G06F 3/1454* (2013.01); *G06F 3/165* (2013.01); *G06F 9/542* (2013.01); *G06F 9/548* (2013.01); *G06F 11/302* (2013.01); *G06F 11/3409* (2013.01); *G06F 11/3438* (2013.01); *G06F 16/116* (2019.01); *G06F 16/144* (2019.01); *G06F 16/2282* (2019.01); *G06F 16/23* (2019.01); *G06F 16/2308* (2019.01); *G06F 16/2365* (2019.01); *G06F 16/2393* (2019.01); *G06F 16/248* (2019.01); *G06F 16/2456* (2019.01); *G06F 16/24564* (2019.01); *G06F 16/24565* (2019.01); *G06F 16/258* (2019.01); *G06F 16/26* (2019.01); *G06F 16/287* (2019.01); *G06F 16/328* (2019.01); *G06F 16/909* (2019.01); *G06F 16/9017* (2019.01); *G06F 16/9038* (2019.01); *G06F 16/90328* (2019.01); *G06F 16/90344* (2019.01); *G06F 16/951* (2019.01); *G06F 16/9536* (2019.01); *G06F 40/103* (2020.01); *G06F 40/106* (2020.01); *G06F 40/177* (2020.01); *G06F 40/186* (2020.01); *G06F 40/253* (2020.01); *G06F 40/279* (2020.01); *G06F 40/30* (2020.01); *G06F 40/40* (2020.01); *G06K 9/6215* (2013.01); *G06N 20/00* (2019.01); *G06Q 10/0633* (2013.01); *G06Q 10/06312* (2013.01); *G06Q 10/06313* (2013.01); *G06Q 10/06316* (2013.01); *G06Q 10/063114* (2013.01); *G06Q 10/063118* (2013.01); *G06Q 10/101* (2013.01); *G06T 11/206* (2013.01); *H04L 12/1827* (2013.01); *H04L 51/04* (2013.01); *H04L 51/046* (2013.01); *H04L 51/18* (2013.01); *H04L 51/48* (2022.05); *H04L 65/4015* (2013.01); *H04L 67/1095* (2013.01); *B65D 83/0409* (2013.01); *G06F 2201/865* (2013.01); *G06F 2201/88* (2013.01); *G06F 2203/04803* (2013.01); *G06T 2200/24* (2013.01)

(58) Field of Classification Search
CPC ......... G06Q 10/06316; G06Q 10/0633; G06Q 10/063114; G06Q 10/063118; G05B 13/0265; G06F 3/04817; G06F 3/0482; G06F 3/0484; G06F 3/04845; G06F 3/1454; G06F 3/165; G06F 9/542; G06F 9/548; G06F 11/302; G06F 11/3409; G06F 11/3438; G06F 16/116; G06F 16/144; G06F 16/2282; G06F 16/23; G06F 16/2308; G06F 16/2365; G06F 16/2393; G06F 16/2456; G06F 16/24564; G06F 16/24565; G06F 16/248; G06F 16/258; G06F 16/26; G06F 16/287; G06F 16/328; G06F 16/9017; G06F 16/90328; G06F 16/90344; G06F 16/9038; G06F 16/909; G06F 16/951; G06F 16/9536; G06F 40/103; G06F 40/106; G06F 40/177; G06F 40/186; G06F 40/253; G06F 40/279; G06F 40/30; G06F 40/40; G06F 2201/865; G06F 2201/88; G06F 2203/04803; G06F 2203/04106; G06F 2203/04808; G06F 3/0488; G06F 3/167;
G06F 40/18; G06K 9/6215; G06N 20/00;
G06N 5/022; G06N 5/025; G06T 11/206;
G06T 2200/24; G06T 11/60; H04L
12/1827; H04L 51/04; H04L 51/046;
H04L 51/18; H04L 51/48; H04L 65/4015;
H04L 67/1095; H04L 51/10; H04L
65/403; B65D 83/0409
USPC .................. 705/1.1–912, 300, 301, 320
See application file for complete search history.

(56) References Cited

U.S. PATENT DOCUMENTS

| | | | |
|---|---|---|---|
| 5,479,602 A | 12/1995 | Baecker et al. | |
| 5,517,663 A | 5/1996 | Kahn | |
| 5,632,009 A | 5/1997 | Rao et al. | |
| 5,682,469 A | 10/1997 | Linnett | |
| 5,696,702 A | 12/1997 | Skinner et al. | |
| 5,726,701 A | 3/1998 | Needham | |
| 5,787,411 A | 7/1998 | Groff et al. | |
| 5,880,742 A | 3/1999 | Rao et al. | |
| 5,933,145 A | 8/1999 | Meek | |
| 6,016,438 A | 1/2000 | Wakayama | |
| 6,016,553 A | 1/2000 | Schneider et al. | |
| 6,023,695 A | 2/2000 | Osborn et al. | |
| 6,034,681 A | 3/2000 | Miller et al. | |
| 6,049,622 A | 4/2000 | Robb et al. | |
| 6,108,573 A | 8/2000 | Debbins et al. | |
| 6,111,573 A | 8/2000 | McComb et al. | |
| 6,167,405 A | 12/2000 | Rosensteel, Jr. et al. | |
| 6,169,534 B1 | 1/2001 | Raffel et al. | |
| 6,182,127 B1 | 1/2001 | Cronin, III et al. | |
| 6,185,582 B1 | 2/2001 | Zellweger et al. | |
| 6,195,794 B1 | 2/2001 | Buxton | |
| 6,266,067 B1 | 7/2001 | Owen et al. | |
| 6,275,809 B1 | 8/2001 | Tamaki et al. | |
| 6,330,022 B1 * | 12/2001 | Seligmann | H04N 7/147 348/E7.083 |
| 6,377,965 B1 | 4/2002 | Hachamovitch et al. | |
| 6,385,617 B1 | 5/2002 | Malik | |
| 6,460,043 B1 | 10/2002 | Tabbara et al. | |
| 6,496,832 B2 | 12/2002 | Chi et al. | |
| 6,509,912 B1 | 1/2003 | Moran et al. | |
| 6,510,459 B2 | 1/2003 | Cronin, III et al. | |
| 6,522,347 B1 | 2/2003 | Tsuji et al. | |
| 6,527,556 B1 | 3/2003 | Koskinen | |
| 6,567,830 B1 | 5/2003 | Madduri | |
| 6,606,740 B1 | 8/2003 | Lynn et al. | |
| 6,636,242 B2 | 10/2003 | Bowman-Amuah | |
| 6,647,370 B1 | 11/2003 | Fu et al. | |
| 6,661,431 B1 | 12/2003 | Stuart et al. | |
| 6,988,248 B1 | 1/2006 | Tang et al. | |
| 7,027,997 B1 | 4/2006 | Robinson et al. | |
| 7,034,860 B2 | 4/2006 | Lia et al. | |
| 7,043,529 B1 | 5/2006 | Simonoff | |
| 7,054,891 B2 | 5/2006 | Cole | |
| 7,237,188 B1 | 6/2007 | Leung | |
| 7,249,042 B1 | 7/2007 | Doerr et al. | |
| 7,272,637 B1 | 9/2007 | Himmelstein | |
| 7,274,375 B1 | 9/2007 | David | |
| 7,379,934 B1 | 5/2008 | Forman et al. | |
| 7,383,320 B1 | 6/2008 | Silberstein et al. | |
| 7,389,473 B1 | 6/2008 | Sawicki et al. | |
| 7,415,664 B2 | 8/2008 | Aureglia et al. | |
| 7,417,644 B2 | 8/2008 | Cooper et al. | |
| 7,461,077 B1 | 12/2008 | Greenwood | |
| 7,489,976 B2 | 2/2009 | Adra | |
| 7,617,443 B2 | 11/2009 | Mills et al. | |
| 7,685,152 B2 | 3/2010 | Chivukula et al. | |
| 7,707,514 B2 | 4/2010 | Forstall et al. | |
| 7,710,290 B2 | 5/2010 | Johnson | |
| 7,770,100 B2 | 8/2010 | Chamberlain et al. | |
| 7,827,476 B1 | 11/2010 | Roberts et al. | |
| 7,827,615 B1 | 11/2010 | Allababidi et al. | |
| 7,916,157 B1 | 3/2011 | Kelley et al. | |
| 7,921,360 B1 | 4/2011 | Sundermeyer et al. | |
| 7,954,064 B2 | 5/2011 | Forstall et al. | |
| 8,046,703 B2 | 10/2011 | Busch et al. | |
| 8,078,955 B1 | 12/2011 | Gupta | |
| 8,082,274 B2 | 12/2011 | Steinglass et al. | |
| 8,108,241 B2 | 1/2012 | Shukoor | |
| 8,136,031 B2 | 3/2012 | Massand | |
| 8,151,213 B2 | 4/2012 | Weitzman et al. | |
| 8,223,172 B1 | 7/2012 | Miller et al. | |
| 8,286,072 B2 | 10/2012 | Chamberlain et al. | |
| 8,365,095 B2 | 1/2013 | Bansal et al. | |
| 8,375,327 B2 | 2/2013 | Lorch et al. | |
| 8,386,960 B1 | 2/2013 | Eismann et al. | |
| 8,407,217 B1 | 3/2013 | Zhang | |
| 8,413,261 B2 | 4/2013 | Nemoy et al. | |
| 8,423,909 B2 | 4/2013 | Zabielski | |
| 8,543,566 B2 | 9/2013 | Weissman et al. | |
| 8,548,997 B1 | 10/2013 | Wu | |
| 8,560,942 B2 | 10/2013 | Fortes et al. | |
| 8,566,732 B2 | 10/2013 | Louch et al. | |
| 8,572,173 B2 | 10/2013 | Briere et al. | |
| 8,578,399 B2 | 11/2013 | Khen et al. | |
| 8,601,383 B2 | 12/2013 | Folting et al. | |
| 8,620,703 B1 | 12/2013 | Kapoor et al. | |
| 8,621,652 B2 | 12/2013 | Slater, Jr. | |
| 8,677,448 B1 | 3/2014 | Kauffman et al. | |
| 8,738,414 B1 | 5/2014 | Nagar et al. | |
| 8,786,597 B2 * | 7/2014 | Doganata | G06T 11/203 345/419 |
| 8,812,471 B2 | 8/2014 | Akita | |
| 8,819,042 B2 | 8/2014 | Samudrala et al. | |
| 8,825,758 B2 | 9/2014 | Bailor et al. | |
| 8,838,533 B2 | 9/2014 | Kwiatkowski et al. | |
| 8,862,979 B2 | 10/2014 | Hawking | |
| 8,863,022 B2 | 10/2014 | Rhodes et al. | |
| 8,869,027 B2 | 10/2014 | Louch et al. | |
| 8,937,627 B1 | 1/2015 | Otero et al. | |
| 8,938,465 B2 | 1/2015 | Messer | |
| 8,954,871 B2 | 2/2015 | Louch et al. | |
| 9,007,405 B1 | 4/2015 | Eldar et al. | |
| 9,015,716 B2 | 4/2015 | Fletcher et al. | |
| 9,026,897 B2 | 5/2015 | Zarras | |
| 9,043,362 B2 | 5/2015 | Weissman et al. | |
| 9,063,958 B2 | 6/2015 | Müller et al. | |
| 9,129,234 B2 | 9/2015 | Campbell et al. | |
| 9,159,246 B2 | 10/2015 | Rodriguez et al. | |
| 9,172,738 B1 | 10/2015 | daCosta | |
| 9,183,303 B1 | 11/2015 | Goel et al. | |
| 9,223,770 B1 | 12/2015 | Ledet | |
| 9,239,719 B1 | 1/2016 | Feinstein et al. | |
| 9,244,917 B1 | 1/2016 | Sharma et al. | |
| 9,253,130 B2 | 2/2016 | Zaveri | |
| 9,286,246 B2 | 3/2016 | Saito et al. | |
| 9,286,475 B2 | 3/2016 | Li et al. | |
| 9,292,587 B2 | 3/2016 | Kann et al. | |
| 9,336,502 B2 | 5/2016 | Mohammad et al. | |
| 9,342,579 B2 | 5/2016 | Cao et al. | |
| 9,361,287 B1 | 6/2016 | Simon et al. | |
| 9,390,059 B1 | 7/2016 | Gur et al. | |
| 9,424,287 B2 | 8/2016 | Schroth | |
| 9,424,333 B1 | 8/2016 | Bisignani et al. | |
| 9,424,545 B1 | 8/2016 | Lee | |
| 9,430,458 B2 | 8/2016 | Rhee et al. | |
| 9,449,031 B2 | 9/2016 | Barrus et al. | |
| 9,495,386 B2 | 11/2016 | Tapley et al. | |
| 9,558,172 B2 | 1/2017 | Rampson et al. | |
| 9,613,086 B1 | 4/2017 | Sherman | |
| 9,635,091 B1 | 4/2017 | Laukkanen et al. | |
| 9,679,456 B2 | 6/2017 | East | |
| 9,720,602 B1 | 8/2017 | Chen et al. | |
| 9,727,376 B1 | 8/2017 | Bills et al. | |
| 9,760,271 B2 | 9/2017 | Persaud | |
| 9,794,256 B2 | 10/2017 | Kiang et al. | |
| 9,798,829 B1 | 10/2017 | Baisley | |
| 9,811,676 B1 | 11/2017 | Gauvin | |
| 9,866,561 B2 | 1/2018 | Psenka et al. | |
| 9,870,136 B2 | 1/2018 | Pourshahid | |
| 10,043,296 B2 | 8/2018 | Li | |
| 10,067,928 B1 | 9/2018 | Krappe | |

(56) References Cited

U.S. PATENT DOCUMENTS

| | | |
|---|---|---|
| 10,078,668 B1 | 9/2018 | Woodrow et al. |
| 10,169,306 B2 | 1/2019 | O'Shaughnessy et al. |
| 10,176,154 B2 | 1/2019 | Ben-Aharon et al. |
| 10,235,441 B1 | 3/2019 | Makhlin et al. |
| 10,255,609 B2 | 4/2019 | Kinkead et al. |
| 10,282,405 B1 | 5/2019 | Silk et al. |
| 10,282,406 B2 | 5/2019 | Bissantz |
| 10,311,080 B2 | 6/2019 | Folting et al. |
| 10,327,712 B2 | 6/2019 | Beymer et al. |
| 10,347,017 B2 | 7/2019 | Ruble et al. |
| 10,372,706 B2 | 8/2019 | Chavan et al. |
| 10,380,140 B2 | 8/2019 | Sherman |
| 10,423,758 B2 | 9/2019 | Kido et al. |
| 10,445,702 B1 | 10/2019 | Hunt |
| 10,452,360 B1 | 10/2019 | Burman et al. |
| 10,453,118 B2 | 10/2019 | Smith et al. |
| 10,474,317 B2 | 11/2019 | Ramanathan et al. |
| 10,489,391 B1 | 11/2019 | Tomlin |
| 10,489,462 B1 | 11/2019 | Rogynskyy et al. |
| 10,496,737 B1 | 12/2019 | Sayre et al. |
| 10,505,825 B1 | 12/2019 | Bettaiah et al. |
| 10,528,599 B1 | 1/2020 | Pandis et al. |
| 10,534,507 B1 | 1/2020 | Laukkanen et al. |
| 10,540,152 B1 | 1/2020 | Krishnaswamy et al. |
| 10,540,434 B2 | 1/2020 | Migeon et al. |
| 10,546,001 B1 | 1/2020 | Nguyen et al. |
| 10,564,622 B1 | 2/2020 | Dean et al. |
| 10,573,407 B2 | 2/2020 | Ginsburg |
| 10,579,724 B2 | 3/2020 | Campbell et al. |
| 10,628,002 B1 | 4/2020 | Kang et al. |
| 10,698,594 B2 | 6/2020 | Sanches et al. |
| 10,706,061 B2 | 7/2020 | Sherman et al. |
| 10,719,220 B2 | 7/2020 | Ouellet et al. |
| 10,733,256 B2 | 8/2020 | Fickenscher et al. |
| 10,740,117 B2 | 8/2020 | Ording et al. |
| 10,742,695 B1 * | 8/2020 | Brown .................... H04L 51/02 |
| 10,747,764 B1 | 8/2020 | Plenderleith |
| 10,747,950 B2 | 8/2020 | Dang et al. |
| 10,748,312 B2 | 8/2020 | Ruble et al. |
| 10,754,688 B2 | 8/2020 | Powell |
| 10,761,691 B2 | 9/2020 | Anzures et al. |
| 10,795,555 B2 | 10/2020 | Burke et al. |
| 10,817,660 B2 | 10/2020 | Rampson et al. |
| D910,077 S | 2/2021 | Naroshevitch et al. |
| 10,963,578 B2 | 3/2021 | More et al. |
| 11,010,371 B1 | 5/2021 | Slomka et al. |
| 11,042,363 B1 | 6/2021 | Krishnaswamy et al. |
| 11,042,699 B1 | 6/2021 | Sayre et al. |
| 11,048,714 B2 | 6/2021 | Sherman et al. |
| 11,076,052 B2 * | 7/2021 | Cartwright ............... G10L 15/02 |
| 11,128,483 B1 * | 9/2021 | Surazski ................ G10L 25/87 |
| 11,243,688 B1 | 2/2022 | Remy et al. |
| 2001/0008998 A1 | 7/2001 | Tamaki et al. |
| 2001/0032248 A1 | 10/2001 | Krafchin |
| 2001/0039551 A1 | 11/2001 | Saito et al. |
| 2002/0002459 A1 | 1/2002 | Lewis et al. |
| 2002/0065849 A1 | 5/2002 | Ferguson et al. |
| 2002/0065880 A1 | 5/2002 | Hasegawa et al. |
| 2002/0069207 A1 | 6/2002 | Alexander et al. |
| 2002/0075309 A1 | 6/2002 | Michelman et al. |
| 2002/0082892 A1 | 6/2002 | Raffel et al. |
| 2002/0138528 A1 | 9/2002 | Gong et al. |
| 2003/0033196 A1 | 2/2003 | Tomlin |
| 2003/0041113 A1 | 2/2003 | Larsen |
| 2003/0051377 A1 | 3/2003 | Chirafesi, Jr. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0101416 A1 | 5/2003 | McInnes et al. |
| 2003/0135558 A1 | 7/2003 | Bellotti et al. |
| 2003/0137536 A1 | 7/2003 | Hugh |
| 2003/0187864 A1 | 10/2003 | McGoveran |
| 2003/0200215 A1 | 10/2003 | Chen et al. |
| 2003/0204490 A1 | 10/2003 | Kasriel |
| 2004/0032432 A1 | 2/2004 | Baynger |
| 2004/0098284 A1 | 5/2004 | Petito et al. |
| 2004/0133441 A1 | 7/2004 | Brady et al. |
| 2004/0138939 A1 | 7/2004 | Theiler |
| 2004/0139400 A1 | 7/2004 | Allam et al. |
| 2004/0162833 A1 | 8/2004 | Jones et al. |
| 2004/0172592 A1 | 9/2004 | Collie et al. |
| 2004/0212615 A1 | 10/2004 | Uthe |
| 2004/0215443 A1 | 10/2004 | Hatton |
| 2004/0230940 A1 | 11/2004 | Cooper et al. |
| 2004/0268227 A1 | 12/2004 | Brid |
| 2005/0034058 A1 | 2/2005 | Mills et al. |
| 2005/0034064 A1 | 2/2005 | Meyers et al. |
| 2005/0039001 A1 | 2/2005 | Hudis et al. |
| 2005/0039033 A1 | 2/2005 | Meyers et al. |
| 2005/0044486 A1 | 2/2005 | Kotler et al. |
| 2005/0063615 A1 | 3/2005 | Siegel et al. |
| 2005/0066306 A1 | 3/2005 | Diab |
| 2005/0086360 A1 | 4/2005 | Mamou et al. |
| 2005/0091314 A1 | 4/2005 | Blagsvedt et al. |
| 2005/0091596 A1 | 4/2005 | Anthony et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0165600 A1 | 7/2005 | Kasravi et al. |
| 2005/0171881 A1 | 8/2005 | Ghassemieh et al. |
| 2005/0216830 A1 | 9/2005 | Turner et al. |
| 2005/0228250 A1 | 10/2005 | Bitter et al. |
| 2005/0251021 A1 | 11/2005 | Kaufman et al. |
| 2005/0257204 A1 | 11/2005 | Bryant et al. |
| 2005/0278297 A1 | 12/2005 | Nelson |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0013462 A1 | 1/2006 | Sadikali |
| 2006/0015499 A1 | 1/2006 | Clissold et al. |
| 2006/0015806 A1 | 1/2006 | Wallace |
| 2006/0031148 A1 | 2/2006 | O'Dell et al. |
| 2006/0036568 A1 | 2/2006 | Moore et al. |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0080594 A1 | 4/2006 | Chavoustie et al. |
| 2006/0090169 A1 | 4/2006 | Daniels et al. |
| 2006/0106642 A1 | 5/2006 | Reicher et al. |
| 2006/0107196 A1 | 5/2006 | Thanu et al. |
| 2006/0111953 A1 | 5/2006 | Setya |
| 2006/0129415 A1 | 6/2006 | Thukral et al. |
| 2006/0136828 A1 | 6/2006 | Asano |
| 2006/0150090 A1 | 7/2006 | Swamidass |
| 2006/0173908 A1 | 8/2006 | Browning et al. |
| 2006/0190313 A1 | 8/2006 | Lu |
| 2006/0212299 A1 | 9/2006 | Law |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0236246 A1 | 10/2006 | Bono et al. |
| 2006/0250369 A1 | 11/2006 | Keim |
| 2006/0253205 A1 | 11/2006 | Gardiner |
| 2006/0271574 A1 | 11/2006 | Villaron et al. |
| 2006/0287998 A1 | 12/2006 | Folting et al. |
| 2006/0294451 A1 | 12/2006 | Kelkar et al. |
| 2007/0027932 A1 | 2/2007 | Thibeault |
| 2007/0033531 A1 | 2/2007 | Marsh |
| 2007/0050322 A1 | 3/2007 | Vigesaa et al. |
| 2007/0050379 A1 | 3/2007 | Day et al. |
| 2007/0073899 A1 | 3/2007 | Judge et al. |
| 2007/0092048 A1 | 4/2007 | Chelstrom et al. |
| 2007/0094607 A1 | 4/2007 | Morgan et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0186173 A1 | 8/2007 | Both et al. |

(56) References Cited

U.S. PATENT DOCUMENTS

| | | |
|---|---|---|
| 2007/0220119 A1 | 9/2007 | Himmelstein |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034307 A1 | 2/2008 | Cisler et al. |
| 2008/0034314 A1 | 2/2008 | Louch et al. |
| 2008/0052291 A1 | 2/2008 | Bender |
| 2008/0059312 A1 | 3/2008 | Gern et al. |
| 2008/0059539 A1 | 3/2008 | Chin et al. |
| 2008/0065460 A1 | 3/2008 | Raynor |
| 2008/0077530 A1 | 3/2008 | Banas et al. |
| 2008/0097748 A1 | 4/2008 | Haley et al. |
| 2008/0104091 A1 | 5/2008 | Chin |
| 2008/0126389 A1 | 5/2008 | Mush et al. |
| 2008/0133736 A1 | 6/2008 | Wensley et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0183593 A1 | 7/2008 | Dierks |
| 2008/0195948 A1 | 8/2008 | Bauer |
| 2008/0209318 A1 | 8/2008 | Allsop et al. |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0256429 A1 | 10/2008 | Penner et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons |
| 2009/0006171 A1 | 1/2009 | Blatchley et al. |
| 2009/0006283 A1 | 1/2009 | Labrie et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0077164 A1 | 3/2009 | Phillips et al. |
| 2009/0077217 A1 | 3/2009 | McFarland et al. |
| 2009/0083140 A1 | 3/2009 | Phan |
| 2009/0094514 A1 | 4/2009 | Dargahi et al. |
| 2009/0113310 A1 | 4/2009 | Appleyard et al. |
| 2009/0132470 A1 | 5/2009 | Vignet |
| 2009/0150813 A1 | 6/2009 | Chang et al. |
| 2009/0174680 A1 | 7/2009 | Anzures et al. |
| 2009/0192787 A1 | 7/2009 | Roon |
| 2009/0198715 A1 | 8/2009 | Barbarek |
| 2009/0248710 A1 | 10/2009 | McCormack et al. |
| 2009/0271696 A1 | 10/2009 | Bailor et al. |
| 2009/0276692 A1 | 11/2009 | Rosner |
| 2009/0313201 A1 | 12/2009 | Huelsman et al. |
| 2009/0313537 A1 | 12/2009 | Fu et al. |
| 2009/0313570 A1 | 12/2009 | Po et al. |
| 2009/0319623 A1 | 12/2009 | Srinivasan et al. |
| 2009/0319882 A1 | 12/2009 | Morrison et al. |
| 2009/0327240 A1 | 12/2009 | Meehan et al. |
| 2009/0327851 A1 | 12/2009 | Raposo |
| 2009/0327875 A1 | 12/2009 | Kinkoh |
| 2010/0017699 A1 | 1/2010 | Farrell et al. |
| 2010/0070845 A1 | 3/2010 | Facemire et al. |
| 2010/0070895 A1 | 3/2010 | Messer |
| 2010/0088636 A1 | 4/2010 | Yerkes et al. |
| 2010/0095219 A1 | 4/2010 | Stachowiak et al. |
| 2010/0095298 A1 | 4/2010 | Seshadrinathan et al. |
| 2010/0100427 A1 | 4/2010 | McKeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241972 A1 | 9/2010 | Spataro et al. |
| 2010/0241990 A1 | 9/2010 | Gabriel et al. |
| 2010/0251090 A1 | 9/2010 | Chamberlain et al. |
| 2010/0257015 A1 | 10/2010 | Molander |
| 2010/0262625 A1 | 10/2010 | Pittenger |
| 2010/0287163 A1 | 11/2010 | Sridhar et al. |
| 2010/0287221 A1 | 11/2010 | Battepati et al. |
| 2010/0313119 A1 | 12/2010 | Baldwin et al. |
| 2010/0324964 A1 | 12/2010 | Callanan et al. |
| 2010/0332973 A1 | 12/2010 | Kloiber et al. |
| 2011/0010340 A1 | 1/2011 | Hung et al. |
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1 | 5/2011 | Perov et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0209150 A1 | 8/2011 | Hammond et al. |
| 2011/0219321 A1 | 9/2011 | Gonzalez et al. |
| 2011/0225525 A1 | 9/2011 | Chasman et al. |
| 2011/0231273 A1 | 9/2011 | Buchheit |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036462 A1 | 2/2012 | Schwartz et al. |
| 2012/0066587 A1 | 3/2012 | Zhou et al. |
| 2012/0072821 A1 | 3/2012 | Bowling |
| 2012/0079408 A1 | 3/2012 | Rohwer |
| 2012/0081762 A1 | 4/2012 | Yamada |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089610 A1 | 4/2012 | Agrawal et al. |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0124749 A1 | 5/2012 | Lewman |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0192050 A1 | 7/2012 | Campbell et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz, III et al. |
| 2012/0233533 A1 | 9/2012 | Yücel et al. |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0284197 A1 | 11/2012 | Strick et al. |
| 2012/0297307 A1 | 11/2012 | Rider et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2012/0311672 A1 | 12/2012 | Connor et al. |
| 2013/0018952 A1* | 1/2013 | McConnell .......... G06Q 10/101 709/204 |

(56) References Cited

U.S. PATENT DOCUMENTS

| | | |
|---|---|---|
| 2013/0018953 A1* | 1/2013 | McConnell .......... H04L 65/403 709/204 |
| 2013/0018960 A1 | 1/2013 | Knysz et al. |
| 2013/0024418 A1 | 1/2013 | Strick et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0055113 A1 | 2/2013 | Chazin et al. |
| 2013/0063490 A1 | 3/2013 | Zaman et al. |
| 2013/0086460 A1 | 4/2013 | Folting et al. |
| 2013/0090969 A1 | 4/2013 | Rivere |
| 2013/0097490 A1 | 4/2013 | Kotler et al. |
| 2013/0103417 A1 | 4/2013 | Seto et al. |
| 2013/0104035 A1 | 4/2013 | Wagner et al. |
| 2013/0111320 A1 | 5/2013 | Campbell et al. |
| 2013/0117268 A1 | 5/2013 | Smith et al. |
| 2013/0159832 A1 | 6/2013 | Ingargiola et al. |
| 2013/0159907 A1 | 6/2013 | Brosche et al. |
| 2013/0179209 A1 | 7/2013 | Milosevich |
| 2013/0211866 A1 | 8/2013 | Gordon et al. |
| 2013/0212197 A1 | 8/2013 | Karlson |
| 2013/0212234 A1 | 8/2013 | Bartlett et al. |
| 2013/0238363 A1 | 9/2013 | Ohta et al. |
| 2013/0238968 A1 | 9/2013 | Barrus |
| 2013/0246384 A1 | 9/2013 | Victor |
| 2013/0262527 A1 | 10/2013 | Hunter |
| 2013/0268331 A1 | 10/2013 | Bitz et al. |
| 2013/0297468 A1 | 11/2013 | Hirsch et al. |
| 2013/0318424 A1 | 11/2013 | Boyd |
| 2013/0339051 A1 | 12/2013 | Dobrean |
| 2014/0006326 A1 | 1/2014 | Bazanov |
| 2014/0019842 A1 | 1/2014 | Montagna et al. |
| 2014/0033307 A1 | 1/2014 | Schmidtler |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0068403 A1 | 3/2014 | Bhargav et al. |
| 2014/0074545 A1 | 3/2014 | Minder et al. |
| 2014/0075301 A1 | 3/2014 | Mihara |
| 2014/0082525 A1 | 3/2014 | Kass et al. |
| 2014/0101527 A1 | 4/2014 | Suciu |
| 2014/0108985 A1 | 4/2014 | Scott et al. |
| 2014/0109012 A1 | 4/2014 | Choudhary et al. |
| 2014/0111516 A1 | 4/2014 | Hall et al. |
| 2014/0115515 A1 | 4/2014 | Adams et al. |
| 2014/0115518 A1 | 4/2014 | Abdukalykov et al. |
| 2014/0129960 A1 | 5/2014 | Wang et al. |
| 2014/0136972 A1 | 5/2014 | Rodgers et al. |
| 2014/0137003 A1 | 5/2014 | Peters et al. |
| 2014/0137144 A1 | 5/2014 | Jarvenpaa et al. |
| 2014/0172475 A1 | 6/2014 | Olliphant et al. |
| 2014/0173401 A1 | 6/2014 | Oshlag et al. |
| 2014/0188748 A1 | 7/2014 | Cavoue et al. |
| 2014/0195933 A1 | 7/2014 | Rao DV |
| 2014/0214404 A1 | 7/2014 | Kalia et al. |
| 2014/0215303 A1 | 7/2014 | Grigorovitch et al. |
| 2014/0249877 A1 | 9/2014 | Hull et al. |
| 2014/0278638 A1 | 9/2014 | Kreuzkamp et al. |
| 2014/0278720 A1 | 9/2014 | Taguchi |
| 2014/0280287 A1 | 9/2014 | Ganti et al. |
| 2014/0280377 A1 | 9/2014 | Frew |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck, III |
| 2014/0324497 A1 | 10/2014 | Verma et al. |
| 2014/0324501 A1 | 10/2014 | Davidow et al. |
| 2014/0365938 A1 | 12/2014 | Black et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0033149 A1 | 1/2015 | Kuchoor |
| 2015/0067556 A1 | 3/2015 | Tibrewal et al. |
| 2015/0074721 A1 | 3/2015 | Fishman et al. |
| 2015/0074728 A1 | 3/2015 | Chai et al. |
| 2015/0095752 A1 | 4/2015 | Studer et al. |
| 2015/0106736 A1 | 4/2015 | Torman et al. |
| 2015/0125834 A1 | 5/2015 | Mendoza |
| 2015/0142676 A1 | 5/2015 | McGinnis et al. |
| 2015/0142829 A1 | 5/2015 | Lee et al. |
| 2015/0153943 A1 | 6/2015 | Wang |
| 2015/0154660 A1 | 6/2015 | Weald et al. |
| 2015/0169514 A1 | 6/2015 | Sah et al. |
| 2015/0169531 A1 | 6/2015 | Campbell et al. |
| 2015/0188964 A1 | 7/2015 | Sharma et al. |
| 2015/0212717 A1 | 7/2015 | Nair et al. |
| 2015/0220491 A1 | 8/2015 | Cochrane et al. |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0262121 A1 | 9/2015 | Riel-Dalpe et al. |
| 2015/0278699 A1 | 10/2015 | Danielsson |
| 2015/0281292 A1 | 10/2015 | Murayama et al. |
| 2015/0295877 A1 | 10/2015 | Roman |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0055134 A1 | 2/2016 | Sathish et al. |
| 2016/0055374 A1 | 2/2016 | Zhang et al. |
| 2016/0063435 A1 | 3/2016 | Shah et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0117308 A1 | 4/2016 | Haider et al. |
| 2016/0170586 A1 | 6/2016 | Gallo |
| 2016/0173122 A1 | 6/2016 | Akitomi et al. |
| 2016/0210572 A1 | 7/2016 | Shaaban et al. |
| 2016/0224532 A1 | 8/2016 | Miller et al. |
| 2016/0231915 A1 | 8/2016 | Nhan et al. |
| 2016/0232489 A1 | 8/2016 | Skaaksrud |
| 2016/0246490 A1 | 8/2016 | Cabral |
| 2016/0253982 A1 | 9/2016 | Cheung et al. |
| 2016/0259856 A1 | 9/2016 | Ananthapur et al. |
| 2016/0275150 A1 | 9/2016 | Bournonnais et al. |
| 2016/0299655 A1 | 10/2016 | Migos et al. |
| 2016/0321235 A1 | 11/2016 | He et al. |
| 2016/0321604 A1 | 11/2016 | Imaeda et al. |
| 2016/0335302 A1 | 11/2016 | Teodorescu et al. |
| 2016/0335303 A1 | 11/2016 | Madhalam et al. |
| 2016/0335731 A1 | 11/2016 | Hall |
| 2016/0335903 A1 | 11/2016 | Mendoza |
| 2016/0344828 A1 | 11/2016 | Häusler et al. |
| 2016/0350950 A1 | 12/2016 | Ritchie et al. |
| 2016/0381099 A1 | 12/2016 | Keslin et al. |
| 2017/0017779 A1 | 1/2017 | Huang et al. |
| 2017/0031967 A1 | 2/2017 | Chavan et al. |
| 2017/0041296 A1 | 2/2017 | Ford et al. |
| 2017/0052937 A1 | 2/2017 | Sirven et al. |
| 2017/0061342 A1 | 3/2017 | LoRe et al. |
| 2017/0061360 A1 | 3/2017 | Rucker et al. |
| 2017/0061820 A1 | 3/2017 | Firoozbakhsh |
| 2017/0063722 A1 | 3/2017 | Cropper et al. |
| 2017/0075557 A1 | 3/2017 | Noble et al. |
| 2017/0076101 A1 | 3/2017 | Kochhar et al. |
| 2017/0090734 A1 | 3/2017 | Fitzpatrick |
| 2017/0090736 A1 | 3/2017 | King et al. |
| 2017/0091337 A1 | 3/2017 | Patterson |
| 2017/0093876 A1 | 3/2017 | Feng et al. |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |

(56) References Cited

U.S. PATENT DOCUMENTS

| | | |
|---|---|---|
| 2017/0124055 A1 | 5/2017 | Radakovitz et al. |
| 2017/0124740 A1 | 5/2017 | Campbell et al. |
| 2017/0126772 A1 | 5/2017 | Campbell et al. |
| 2017/0132296 A1 | 5/2017 | Ding |
| 2017/0132652 A1 | 5/2017 | Kedzlie et al. |
| 2017/0139874 A1 | 5/2017 | Chin |
| 2017/0139884 A1 | 5/2017 | Bendig et al. |
| 2017/0139891 A1 | 5/2017 | Ah-Soon et al. |
| 2017/0140047 A1 | 5/2017 | Bendig et al. |
| 2017/0140219 A1 | 5/2017 | King et al. |
| 2017/0153771 A1 | 6/2017 | Chu |
| 2017/0177888 A1 | 6/2017 | Arora et al. |
| 2017/0185668 A1 | 6/2017 | Convertino et al. |
| 2017/0200122 A1 | 7/2017 | Edson et al. |
| 2017/0206366 A1 | 7/2017 | Fay et al. |
| 2017/0220813 A1 | 8/2017 | Mullins et al. |
| 2017/0221072 A1 | 8/2017 | AthuluruTlrumala et al. |
| 2017/0228445 A1 | 8/2017 | Chiu et al. |
| 2017/0228460 A1 | 8/2017 | Amel et al. |
| 2017/0236081 A1 | 8/2017 | Grady Smith et al. |
| 2017/0242921 A1 | 8/2017 | Rota |
| 2017/0262786 A1 | 9/2017 | Khasis |
| 2017/0270970 A1 | 9/2017 | Ho et al. |
| 2017/0272316 A1 | 9/2017 | Johnson et al. |
| 2017/0272331 A1 | 9/2017 | Lissack |
| 2017/0277669 A1 | 9/2017 | Sekharan |
| 2017/0285879 A1 | 10/2017 | Pilkington et al. |
| 2017/0285890 A1 | 10/2017 | Dolman |
| 2017/0315683 A1 | 11/2017 | Boucher et al. |
| 2017/0315974 A1 | 11/2017 | Kong et al. |
| 2017/0315979 A1 | 11/2017 | Boucher et al. |
| 2017/0324692 A1 | 11/2017 | Zhou |
| 2017/0329479 A1 | 11/2017 | Rauschenbach et al. |
| 2017/0351252 A1 | 12/2017 | Kleifges et al. |
| 2017/0372442 A1 | 12/2017 | Mejias |
| 2018/0011827 A1 | 1/2018 | Avery et al. |
| 2018/0025084 A1 | 1/2018 | Conlan et al. |
| 2018/0026954 A1 | 1/2018 | Toepke et al. |
| 2018/0032492 A1 | 2/2018 | Altshuller et al. |
| 2018/0032570 A1 | 2/2018 | Miller et al. |
| 2018/0046957 A1* | 2/2018 | Yaari ................ G06Q 10/1095 |
| 2018/0055434 A1 | 3/2018 | Cheung et al. |
| 2018/0075104 A1 | 3/2018 | Oberbreckling et al. |
| 2018/0075115 A1 | 3/2018 | Murray et al. |
| 2018/0075413 A1 | 3/2018 | Culver et al. |
| 2018/0075560 A1 | 3/2018 | Thukral et al. |
| 2018/0077099 A1* | 3/2018 | Silva ................ H04L 12/1831 |
| 2018/0081863 A1 | 3/2018 | Bathla |
| 2018/0081868 A1 | 3/2018 | Willcock et al. |
| 2018/0088753 A1 | 3/2018 | Viégas et al. |
| 2018/0088989 A1 | 3/2018 | Nield et al. |
| 2018/0089299 A1 | 3/2018 | Collins et al. |
| 2018/0095938 A1 | 4/2018 | Monte |
| 2018/0096417 A1 | 4/2018 | Cook et al. |
| 2018/0101281 A1* | 4/2018 | Nelson ................ G06N 5/022 |
| 2018/0101761 A1* | 4/2018 | Nelson ................ G06Q 10/10 |
| 2018/0109760 A1 | 4/2018 | Metter et al. |
| 2018/0121994 A1 | 5/2018 | Matsunaga et al. |
| 2018/0128636 A1 | 5/2018 | Zhou |
| 2018/0129651 A1 | 5/2018 | Latvala et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0157633 A1 | 6/2018 | He et al. |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0210936 A1 | 7/2018 | Reynolds et al. |
| 2018/0225270 A1 | 8/2018 | Bhide et al. |
| 2018/0260371 A1 | 9/2018 | Theodore et al. |
| 2018/0276417 A1 | 9/2018 | Cerezo |
| 2018/0293217 A1 | 10/2018 | Callaghan |
| 2018/0293669 A1 | 10/2018 | Jackson et al. |
| 2018/0329930 A1 | 11/2018 | Eberlein et al. |
| 2018/0330320 A1 | 11/2018 | Kohli |
| 2018/0357305 A1 | 12/2018 | Kinast et al. |
| 2018/0367484 A1 | 12/2018 | Rodriguez et al. |
| 2018/0373434 A1 | 12/2018 | Switzer et al. |
| 2018/0373757 A1 | 12/2018 | Schukovets et al. |
| 2019/0005094 A1 | 1/2019 | Yi et al. |
| 2019/0036989 A1 | 1/2019 | Eirinberg et al. |
| 2019/0042628 A1 | 2/2019 | Rajpara |
| 2019/0050445 A1 | 2/2019 | Griffith et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0068703 A1 | 2/2019 | Vora et al. |
| 2019/0073350 A1 | 3/2019 | Shiotani |
| 2019/0095413 A1 | 3/2019 | Davis et al. |
| 2019/0108046 A1 | 4/2019 | Spencer-Harper et al. |
| 2019/0108834 A1* | 4/2019 | Nelson ................ G10L 15/22 |
| 2019/0113935 A1 | 4/2019 | Kuo et al. |
| 2019/0123924 A1 | 4/2019 | Embiricos et al. |
| 2019/0130611 A1 | 5/2019 | Black et al. |
| 2019/0138583 A1 | 5/2019 | Silk et al. |
| 2019/0138588 A1 | 5/2019 | Silk et al. |
| 2019/0138653 A1 | 5/2019 | Roller et al. |
| 2019/0155821 A1 | 5/2019 | Dirisala |
| 2019/0208058 A1 | 7/2019 | Dvorkin et al. |
| 2019/0236188 A1 | 8/2019 | McKenna |
| 2019/0243879 A1 | 8/2019 | Harley et al. |
| 2019/0251884 A1 | 8/2019 | Burns et al. |
| 2019/0258461 A1 | 8/2019 | Li et al. |
| 2019/0258706 A1 | 8/2019 | Li et al. |
| 2019/0273767 A1* | 9/2019 | Nelson ................ H04L 65/403 |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0325012 A1 | 10/2019 | Delaney et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0019595 A1 | 1/2020 | Garcia |
| 2020/0026397 A1 | 1/2020 | Wohlstadter et al. |
| 2020/0042648 A1 | 2/2020 | Rao |
| 2020/0050696 A1 | 2/2020 | Mowatt et al. |
| 2020/0053176 A1 | 2/2020 | Jimenez et al. |
| 2020/0125574 A1 | 4/2020 | Ghoshal et al. |
| 2020/0134002 A1 | 4/2020 | Tung et al. |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak et al. |
| 2020/0175094 A1 | 6/2020 | Palmer |
| 2020/0192785 A1 | 6/2020 | Chen |
| 2020/0247661 A1 | 8/2020 | Rao et al. |
| 2020/0265112 A1 | 8/2020 | Fox et al. |
| 2020/0279315 A1 | 9/2020 | Manggala |
| 2020/0301678 A1 | 9/2020 | Burman et al. |
| 2020/0301902 A1 | 9/2020 | Maloy et al. |
| 2020/0327244 A1 | 10/2020 | Blass et al. |
| 2020/0334019 A1 | 10/2020 | Bosworth et al. |
| 2020/0348809 A1 | 11/2020 | Drescher |
| 2020/0349320 A1 | 11/2020 | Owens |
| 2020/0356873 A1 | 11/2020 | Nawrocke et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2021/0019287 A1 | 1/2021 | Prasad et al. |
| 2021/0021603 A1 | 1/2021 | Gibbons |
| 2021/0034058 A1 | 2/2021 | Subramanian et al. |
| 2021/0042796 A1 | 2/2021 | Khoury et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0072883 A1 | 3/2021 | Migunova et al. |
| 2021/0073526 A1 | 3/2021 | Zeng et al. |
| 2021/0084120 A1 | 3/2021 | Fisher et al. |
| 2021/0124749 A1 | 4/2021 | Suzuki et al. |

(56) References Cited

U.S. PATENT DOCUMENTS

| | | | |
|---|---|---|---|
| 2021/0124872 | A1 | 4/2021 | Lereya |
| 2021/0136027 | A1 | 5/2021 | Barbitta et al. |
| 2021/0149553 | A1 | 5/2021 | Lereya et al. |
| 2021/0150489 | A1 | 5/2021 | Haramati et al. |
| 2021/0165782 | A1 | 6/2021 | Deshpande et al. |
| 2021/0166196 | A1 | 6/2021 | Lereya et al. |
| 2021/0166339 | A1 | 6/2021 | Mann et al. |
| 2021/0173682 | A1 | 6/2021 | Chakraborti et al. |
| 2021/0174006 | A1 | 6/2021 | Stokes |
| 2021/0192126 | A1 | 6/2021 | Gehrmann et al. |
| 2021/0264220 | A1 | 8/2021 | Wei et al. |
| 2021/0319408 | A1* | 10/2021 | Jorasch .............. G06Q 10/1095 |
| 2021/0326519 | A1 | 10/2021 | Lin et al. |
| 2022/0221591 | A1 | 7/2022 | Smith et al. |

FOREIGN PATENT DOCUMENTS

| | | |
|---|---|---|
| CN | 107123424 A | 9/2017 |
| CN | 107422666 A | 12/2017 |
| CN | 107623596 A | 1/2018 |
| CN | 107885656 A | 4/2018 |
| CN | 112929172 A | 6/2021 |
| EP | 3 443 466 B1 | 12/2021 |
| KR | 20150100760 | 9/2015 |
| WO | WO 2004/100015 A2 | 11/2004 |
| WO | WO 2006/116580 A2 | 11/2006 |
| WO | WO 2008109541 A1 | 9/2008 |
| WO | WO 2017202159 A1 | 11/2017 |
| WO | WO 2020/187408 A1 | 9/2020 |
| WO | WO 2021096944 A1 | 5/2021 |
| WO | WO 2021144656 A1 | 7/2021 |
| WO | WO 2021161104 A1 | 8/2021 |
| WO | WO 2021220058 A1 | 11/2021 |

OTHER PUBLICATIONS

Rordigo et al., Project Management with Monday.com: a 101 Introduction; Jul. 22, 2019, pp. 1-21, 2019.
International Search Report and Written Opinion of the International Searching Authority in PCT/IB2020/000658, dated Nov. 11, 2020 (12 pages).
International Search Report and Written Opinion of the International Searching Authority in PCT/IB2020/000974, dated May 3, 2021 (19 pages).
International Search Report and Written Opinion of the International Searching Authority in PCT/IB2021/000024, dated May 3, 2021 (13 pages).
"Pivot table—Wikipedia"; URL: https://en.wikipedia.org/w/index.php?title=Pivot_table&oldid=857163289, originally retrieved on Oct. 23, 2019; retrieved on Jul. 16, 2021.
International Search Report in PCT/1B2021/000090 dated Jul. 27, 2021.
ShowMyPC, "Switch Presenter While Using ShowMyPC"; web archive.org; Aug. 20, 2016.
International Search Report and Written Opinion of the International Search Authority in PCT/1B2020/000024, dated May 3, 2021 (13 pages).
"Pivot table—Wikipedia"; URL: https://en.wikepedia .org/w/index.php?title=Pivot_table&oldid=857163289, originally retrieve on Oct. 23, 2019; retrieved on Jul. 16, 2021.
Vishal Singh, "A Theoretical Framework of a BIM-based Multi-Disciplinary Collaboration Platform", Nov. 5, 2020, Automation in Construction, 20 (2011), pp. 134-144 (Year: 2011).
Edward A. Stohr, Workflow Automation: Overview and Research Issues, 2001, Information Systems Frontiers 3:3, pp. 281-296 (Year: 2001).
International Search Report and Written Opinion of the International Search Authority in PCT/1B2021/000297, dated Oct. 12, 2021 (20 pages).
Dapulse.com "features".extracted from web.archive.or/web/20140918 18421/https://dapulse.com/features; Sep. 2014 (Year: 2014).

Stephen Larson et al., Introducing Data Mining Concepts Using Microsoft Excel's Table Analysis Tools, Oct. 2015, [Retrieved on Nov. 19, 2021], Retrieved from the internet: <URL: https://dl.acm.org/doi/pdf/10.5555/2831373.2831394> 3 Pages (127-129) (Year: 2015).
Isaiah Pinchas etal., Lexical Analysis Tool, May 2004, [Retrieved on Nov. 19, 2021], Retrieved from the internet: <URL: https://dl.acm.org/doi/pdf/10.1145/997140.997147> 9 Pages (66-74) (Year: 2004).
Sajjad Bahrebar et al., "A Novel Type-2 Fuzzy Logic for Improved Risk Analysis of Proton Exchange Membrane Fuel Cells in Marine Power Systems Application", Energies, 11, 721, pp. 1-16, Mar. 22, 2018.
Pedersen et al., "Tivoli: an electronic whiteboard for informal workgroup meetings", Conference on Human Factors in Computing Systems: Proceedings of the INTERACT '93 and CHI '93 conference on Human factors in computing systems; Apr. 24-29, 1993:391-398. (Year 1993).
Kollmann, Franz, "Realizing Fine-Granular Read and Write Rights on Tree Structured Documents." in The Second International Conference on Availability, Reliability and Security (ARES'07), pp. 517-523. IEEE, 2007. (Year: 2007).
Baarslag, "Negotiation as an Interaction Mechanism for Deciding App Permissions." In Proceedings of the 2016 CHI Conference Extended Abstracts on Human Factors in Computing Systems, pp. 2012-2019. 2016 (Year: 2016).
Peltier, "Clustered and Stacked col. and BarCharts", Aug. 2011, Peltier Technical Services, Inc., pp. 1-128; (Year: 2011).
Beate List, "An Evaluation of Conceptual Business Process Modelling Languages", 2006, SAC'06, Apr. 23-27, pp. 1532-1539 (Year: 2006).
"Demonstracion en espanol de Monday.com", published Feb. 20, 2019. https://www.youtube.com/watch?v=z0qydTgof1A (Year: 2019).
Desmedt et al., "Function-Based Access Control (FBAC) From Access Control Matrix to Access Control Tensor." In Proceedings of the 8th ACM CCS International Workshop on Managing Insider Security Threats, pp. 89-92. (2016).
Anupam, V., et al., "Personalizing the Web Using Site Descriptions", Proceedings of the Tenth International Workshop on Database and Expert Systems Applications, ISBN: 0-7695-0281-4, DOI: 10.1109/DEXA.1999.795275, Jan. 1, 1999, pp. 732-738. (Year: 1999).
Gutwin, C. et al., "Supporting Informal Collaboration in Shared-Workspace Groupware", J. Univers. Comput. Sci., 14(9), 1411-1434 (2008).
U.S. Appl. No. 17/143,897, filed Jan. 7, 2021.
U.S. Appl. No. 17/143,603, filed Jan. 7, 2021.
U.S. Appl. No. 17/143,745, filed Jan. 7, 2021.
U.S. Appl. No. 17/143,482, filed Jan. 7, 2021.
U.S. Appl. No. 17/143,768, filed Jan. 7, 2021.
U.S. Appl. No. 17/143,677, filed Jan. 7, 2021.
U.S. Appl. No. 17/143,653, filed Jan. 7, 2021.
U.S. Appl. No. 17/143,916, filed Jan. 7, 2021.
U.S. Appl. No. 17/143,475, filed Jan. 7, 2021.
U.S. Appl. No. 17/143,865, filed Jan. 7, 2021.
U.S. Appl. No. 17/143,462, filed Jan. 7, 2021.
U.S. Appl. No. 17/143,470, filed Jan. 7, 2021.
U.S. Appl. No. 17/143,905, filed Jan. 7, 2021.
U.S. Appl. No. 17/143,798, filed Jan. 7, 2021.
U.S. Appl. No. 17/143,892, filed Jan. 7, 2021.
U.S. Appl. No. 17/243,716, filed Apr. 29, 2021.
U.S. Appl. No. 17/243,727, filed Apr. 29, 2021.
U.S. Appl. No. 17/232,978, filed Apr. 16, 2021.
U.S. Appl. No. 17/243,809, filed Apr. 29, 2021.
U.S. Appl. No. 17/243,901, filed Apr. 29, 2021.
U.S. Appl. No. 17/232,354, filed Apr. 16, 2021.
U.S. Appl. No. 17/243,898, filed Apr. 29, 2021.
U.S. Appl. No. 17/243,969, filed Apr. 29, 2021.
U.S. Appl. No. 17/243,742, filed Apr. 29, 2021.
U.S. Appl. No. 17/243,752, filed Apr. 29, 2021.
U.S. Appl. No. 17/232,754, filed Apr. 16, 2021.
U.S. Appl. No. 17/232,827, filed Apr. 16, 2021.
U.S. Appl. No. 17/243,763, filed Apr. 29, 2021.

(56) References Cited

OTHER PUBLICATIONS

U.S. Appl. No. 17/243,848, filed Apr. 29, 2021.
U.S. Appl. No. 17/243,934, filed Apr. 29, 2021.
U.S. Appl. No. 17/244,121, filed Apr. 29, 2021.
U.S. Appl. No. 17/243,807, filed Apr. 29, 2021.
U.S. Appl. No. 17/244,027, filed Apr. 29, 2021.
U.S. Appl. No. 17/244,157, filed Apr. 29, 2021.
U.S. Appl. No. 17/243,737, filed Apr. 29, 2021.
U.S. Appl. No. 17/243,748, filed Apr. 29, 2021.
U.S. Appl. No. 16/453,065, filed Jun. 26, 2019.
U.S. Appl. No. 17/243,691, filed Apr. 29, 2021.
U.S. Appl. No. 17/243,722, filed Apr. 29, 2021.
U.S. Appl. No. 17/243,892, filed Apr. 29, 2021.
U.S. Appl. No. 17/243,977, filed Apr. 29, 2021.
U.S. Appl. No. 17/243,764, filed Apr. 29, 2021.
U.S. Appl. No. 17/243,837, filed Apr. 29, 2021.
U.S. Appl. No. 17/243,729, filed Apr. 29, 2021.
U.S. Appl. No. 17/243,802, filed Apr. 29, 2021.
U.S. Appl. No. 17/242,452, filed Apr. 28, 2021.
U.S. Appl. No. 17/243,891, filed Apr. 29, 2021.
U.S. Appl. No. 17/243,775, filed Apr. 29, 2021.
U.S. Appl. No. 17/243,731, filed Apr. 29, 2021.
U.S. Appl. No. 17/243,768, filed Apr. 29, 2021.
U.S. Appl. No. 16/502,679, filed Jul. 3, 2019.
U.S. Appl. No. 17/565,652, filed Dec. 30, 2021.
U.S. Appl. No. 17/565,699, filed Dec. 30, 2021.
U.S. Appl. No. 17/565,853, filed Dec. 30, 2021.
U.S. Appl. No. 17/564,745, filed Dec. 29, 2021.
U.S. Appl. No. 17/565,526, filed Dec. 30, 2021.
U.S. Appl. No. 17/565,614, filed Dec. 30, 2021.
U.S. Appl. No. 17/565,718, filed Dec. 30, 2021.
U.S. Appl. No. 17/565,843, filed Dec. 30, 2021.
U.S. Appl. No. 17/565,880, filed Dec. 30, 2021.
U.S. Appl. No. 17/565,534, filed Dec. 30, 2021.
U.S. Appl. No. 17/565,801, filed Dec. 30, 2021.
U.S. Appl. No. 17/565,821, filed Dec. 30, 2021.
U.S. Appl. No. 17/565,780, filed Dec. 30, 2021.

* cited by examiner

| | | | | | | | |
|---|---|---|---|---|---|---|---|
| | Team Tasks ☆ | | | Last seen | &Invite / 1  ⋏Activity | + Add to board | ... |
| | Add Board description | | | | ⬢M Integrate / 0  Automate / 3 | | |
| | ≡ All views  \|  ⊞ Main Table ⚲ | | | | | | |

| | | | 316 | 318 | 320 | 322 | 324 |
|---|---|---|---|---|---|---|---|
| 301 | ⊙ This Week | | Owner | Status | 🔔 Date | Priority | Time Est. ⊕ |
| 302 | Task 1 | 💬 | ⓐ | Working on it | ● Dec 19 | High | 2h |
| 304 | Task 2 | 💬 | ⓐ | Working on it | ⓘ Dec 15 | High | 5h |
| 306 | Task 3 | 💬 | ⓐ | Waiting for review | ● Dec 19 | Medium | 2.5h |
| 308 | Task 4 | 💬 | ⓐ | | ● Dec 21 | Medium | 7h |
| 310 | + Add | | | | | | |
| | | | | | | | 16.5h sum |

| | | | 316 | 318 | 320 | 322 | 324 |
|---|---|---|---|---|---|---|---|
| 311 | ⊙ Next Week | | Owner | Status | 🔔 Date | Priority | Time Est. ⊕ |
| 312 | Task 5 | 💬 | ⓐ | | ⓘ Dec 15 | High | 2h |
| 314 | + Add | | | | | | |
| | | | | | | | 2h sum |

| Project ☆ | | | Last seen ⓒ | & Invite / 2 | ∿ Activity | + Add to board | ... |
|---|---|---|---|---|---|---|---|
| Add board description | | | | | | | |
| ≡ All views | 🖽 Main Table ¥ | 🗎 Form ¥ | | | Integrate / 2 | Automate / 1 | ⓥ |

| New Item ▾ | ⌕ Search | ⓒ Person | ▽ Filter ∨ | ↕ Sort | 📌 ⌘ ≣ ◇ ✎ | | | 1222 |
|---|---|---|---|---|---|---|---|---|
| ⓥ Project 1202 | | Summary 1104 | Priority 1106 | | Description 1108 | | | Abcd Issue ⊕ |
| Item 1 ∿ 1204 | 💬 | Summary 1 | Low | | Description 1 | | | |
| Item 2 ∿ 1206 | 💬 | Summary 2 | Low | | Description 2 | | | |
| Item 3 ∿ 1208 | 💬 | Summary 3 | Low | | Description 3 | | | |
| Item 4 ∿ 1210 | 💬 | Summary 4 | Low | | Description 4 | | | |
| Item 5 ∿ 1212 | 💬 | Summary 5 | Low | | Description 5 | | | |
| Item 6 ∿ 1214 | 💬 | Summary 6 | Low | | Description 6 | | | |
| Item 7 ∿ 1216 | 💬 | Summary 7 | Low | | Description 7 | | | |
| Item 8 ∿ 1218 | 💬 | Summary 8 | Low | | Description 8 | | | 1304 |
| New Item ∿ 1302 | 💬 | Summary 9 | High | | Description 9 | | | Link to Jira |
| + Add ∿ 1220 | | | | | | | | |

DIGITAL PROCESSING SYSTEMS AND METHODS FOR COMMUNICATIONS TRIGGERING TABLE ENTRIES IN COLLABORATIVE WORK SYSTEMS

CROSS-REFERENCE TO RELATED APPLICATIONS

This application is a continuation of and claims benefit of priority of International Application No. PCT/IB2021/00297, filed on Apr. 28, 2021, which claims priority to U.S. Provisional Patent Application No. 63/018,593, filed May 1, 2020, U.S. Provisional Patent Application No. 63/019,396, filed May 3, 2020, U.S. Provisional Patent Application No. 63/078,301, filed Sep. 14, 2020, U.S. Provisional Patent Application No. 63/121,803, filed on Dec. 4, 2020, U.S. Provisional Patent Application No. 63/122,439, filed on Dec. 7, 2020, and U.S. Provisional Patent Application No. 63/148,092, filed on Feb. 10, 2021. This application is also a continuation-in-part of and claim benefit of priority of International Application No. PCT/IB2020/000658, filed on Aug. 7, 2020, International Application No. PCT/IB2020/000974, filed on Nov. 17, 2020, International Application No. PCT/IB2021/000024, filed on Jan. 14, 2021, and International Application No. PCT/IB2021/000090, filed on Feb. 11, 2021. The contents of all of the above-noted applications are incorporated herein by reference in their entireties.

TECHNICAL FIELD

Embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

SUMMARY

A system for graphically aggregating data from a plurality of distinct tables, and enabling dissociation of underlying aggregated data from the associated distinct tables, the system comprising at least one processor configured to maintain the plurality of distinct tables, wherein each distinct table contains a plurality of items, with each item being made up of a plurality of cells categorized by category indicators, and wherein the plurality of distinct tables contain a common category indicator; generate a graphical representation of a plurality of variables within the plurality of cells associated with the common category indicator, the graphical representation including a plurality of sub-portions, each sub-portion representing a differing variable of the common category indicator; receive a selection of a sub-portion of the graphical representation; perform a look-up across the plurality of distinct tables for a specific variable associated with the received selection; and based on the look-up, cause an aggregated display of a plurality of items dissociated from the differing tables, wherein each displayed item includes the specific variable and variables associated with additional category indicators A system for syncing data between a tabular platform and a third-party application, the system comprising at least one processor configured to access a first platform that displays a first set of data in a first format; access a second platform that displays a second set of data in a second format; link the first set of data with the second set of data to enable migration of the first set of data to the second platform and the second set of data to the first platform; enable the first platform to simultaneously display the second set of data in the second format; enable alteration of the second set of data in the second platform through manipulation of the simultaneous display of the second set of data in the first platform; and in response to receiving an alteration, sync the second set of data as altered via the first platform with the first data set.

A workflow management system for triggering table entries characterizing workflow-related communications occurring between workflow participants, the system comprising at least one processor configured to present a table via a display, the table containing rows and columns defining cells, the rows and cells being configured to manage respective roles of the workflow participants; present on the display at least one active link for enabling workflow participants to join in a video or an audio communication; log in memory, characteristics of the communication including identities of the workflow participants who joined in the communication; and generate an object associated with the table, the object containing the characteristics of the communication logged in memory.

BRIEF DESCRIPTION OF THE DRAWINGS

FIG. 3 illustrates an example of an interface with a first table (source or underlying table) containing various cells which are used as underlying data for an aggregated display of a plurality of items dissociated from differing source tables, consistent with some embodiments of the present disclosure.

FIG. 13 illustrates an example of an interface where a user adds a new item and thus enables alteration of a second set of data in a second platform through manipulation of the interface of data in the first platform and a hyperlink to provide a frame of the second platform within the first platform, consistent with some embodiments of the present disclosure.

FIG. 14 illustrates an example of an interface with an option to provide a frame of a second platform within the first platform, consistent with some embodiments of the present disclosure.

FIG. 15 illustrates an example of an interface providing a frame of a second platform within a first platform, consistent with some embodiments of the present disclosure.

DETAILED DESCRIPTION

Figure 1:
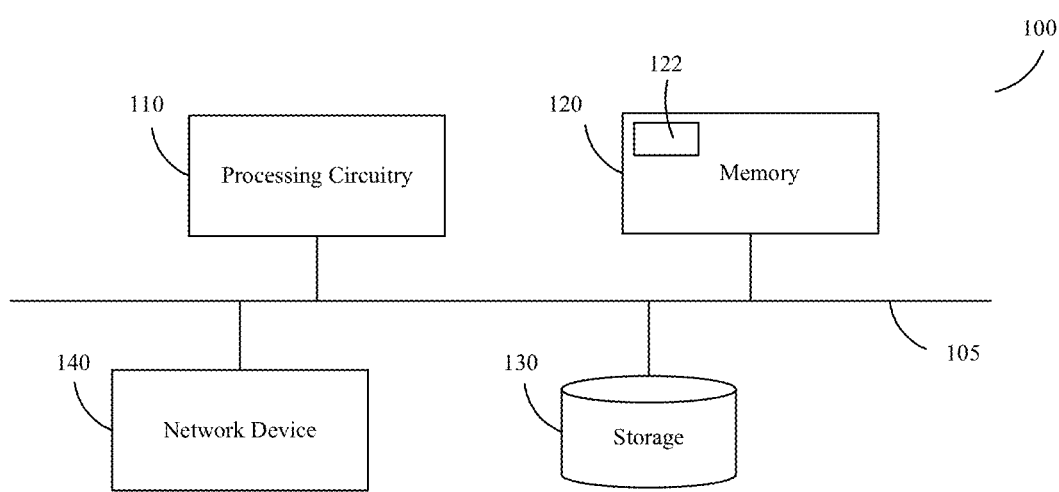
FIG. 1 is a block diagram of an exemplary computing device which may be employed in connection with embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is provided for the convenience of the reader to provide a basic understanding of a few exemplary embodiments and does not wholly define the breadth of the disclosure. This disclosure is not an extensive overview of all contemplated embodiments and is intended to neither identify key or critical elements of all embodiments nor to delineate the scope of any or all aspects. Its sole purpose is to present some features of one or more embodiments in a simplified form as a prelude to the more detailed description presented later. For convenience, the term "certain embodiments" or "exemplary embodiment" may be used herein to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. The platform may allow a user to structure the system in many ways with the same building blocks to represent what the user wants to manage and how the user wants to manage it. This may be accomplished through the use of boards. A board may be a table with items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense, the term "row" may refer to one or more of a horizontal and a vertical presentation. A table or tablature, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, a tablature may include any suitable information. When used in conjunction with a workflow management application, the tablature may include any information associated with one or more tasks, such as one or more status values, projects, countries, persons, teams, progresses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using for example static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
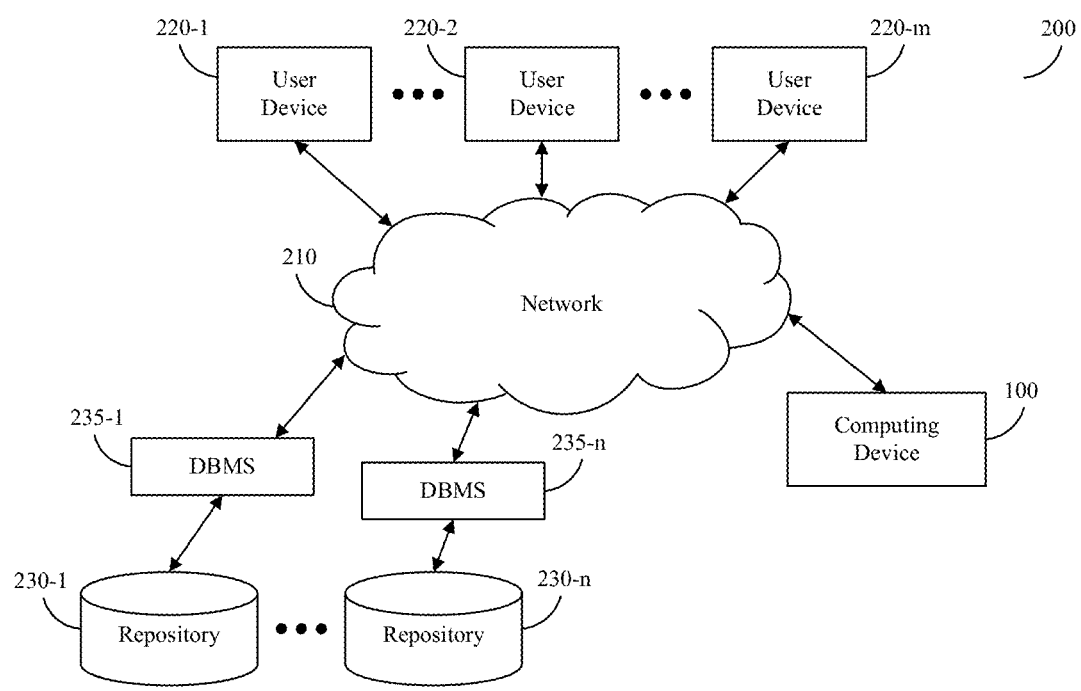
FIG. 2 is a block diagram of an exemplary computing architecture for collaborative work systems, consistent with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-m, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-n, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-n. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

Aspects of this disclosure may relate to graphically aggregating data from a plurality of distinct tables and enabling dissociation of underlying aggregated data from the associated distinct tables, including methods, systems, devices, and computer readable media. For ease of discussion, a non-transitory computer readable medium is described below, with the understanding that aspects of the non-transitory computer readable medium apply equally to systems, methods, and devices. For example, some aspects of such a non-transitory computer readable medium may contain instructions that when executed by at least one processor, causes the at least one processor to perform a method via tablature. The term "tablature" may refer to a tabular space, surface, or structure. Such spaces, surfaces, or structures may include a systematic arrangement of rows, columns, and/or other logical arrangement of regions or locations for presenting, holding, or displaying information.

Aspects of this disclosure may include maintaining the plurality of distinct tables. In some embodiments, a table may involve an arrangement of various cells. The cells may be arranged in horizontal and vertical rows (also referred to as rows and columns). Cells may be defined by intersections of rows and columns. Various rows or columns of the table may be defined to represent different projects, tasks, objects or other items, as well as characteristics of such items. For example, a horizontal row may represent an item and a vertical row may represent a status (which is a characteristic associated with the item). In some embodiments, the items in the table may be unifying rows or columns that represent projects, tasks, property, people, or any object, action, or group of actions that may be tracked. Additionally, the table, which may also be referred to as a board, include a matrix, or any grouping cells displaying various items. Some examples of items in the table may include workflows, real estate holdings, items for delivery, customers, customer interactions, ad campaigns, software bugs, video production, timelines, projects, processes, video production, inventories, personnel, equipment, patients, transportation schedules, resources, securities, assets, meetings, to do items, financial data, transportation schedules, vehicles, manufacturing elements, workloads, capacities, asset usage, events, event information, construction task progress, or any other objects, actions, group of actions, task, property or persons. A table may be considered distinct from another table if at least one of a row, column, contained information, or arrangement differs from that of another table.

A table may be presented to a user in any manner in which the user is capable of viewing information associated with the table. A table may be presented, for example, via a display screen associated with a computing device such as a PC, laptop, tablet, projector, cell phone, or personal wearable device. A table may also be presented virtually through AR or VR glasses. Other mechanism of presenting may also be used to enable a user to visually comprehend presented information. Such information may be presented in cells. A cell may include any area, region or location in which information may be held, displayed, or otherwise presented. Values contained in the cells may include numeric, alphanumeric, or graphical information. The cells may be arranged in the table in vertical and horizontal rows (e.g., rows and columns), or in any other logical fashion.

Maintaining a plurality of distinct tables may include having at least two tables, having access to at least two tables, generating at least two tables, viewing at least two tables, or being provided at least two tables. Distinct tables may include two separate tables. The plurality of distinct tables may include tables from multiple entities or multiple accounts. The plurality of distinct tables may also include distinct tables of a single entity or account. The distinct tables of the single entity or account may include distinct tables sharing a common interface (e.g., table groups, sub-tables associated with a main table but with distinct structure from the main table). Distinct tables may include two or more tables having identical information within various cells or two or more tables having different information within various cells. Maintaining a plurality of distinct tables may include setting up the basic structure of having at least two tables and providing each table at last one cell. For example, in generating table A and table B, each table may have one or more cells.

By way of one example, board 300 of FIG. 3 presents two tables within the team tasks board. As illustrated in this example, there is a plurality of distinct tables: "This Week" table 301 and "Next Week" table 311.

Aspects of this disclosure may include that each distinct table contains a plurality of items, with each item being made up of a plurality of cells categorized by category indicators, and wherein the plurality of distinct tables contain a common category indicator. A plurality of items may include one or more rows within each of the two or more tables. The rows may be horizontal or vertical according to preference.

By way of one example, board 300 of FIG. 3 presents two tables within a team tasks board. As illustrated in this example, there is a plurality of distinct tables: "This Week" table 301 and "Next Week" table 311. Each of these distinct tables contain one or more items. For example, "This Week" table 3301 includes items "Task 1" 302, "Task 2" 304, "Task 3" 306, and "Task 4" 308. "Next Week" table 311 includes item "Task 5" 312.

Each item may be made up of a plurality of cells categorized by category indicators and may include each row being organized by category indicators. Category indicators may include values or representations employed for purposes of organization or grouping. For example, a category indicator may include a column heading (e.g., Status, Person, Description, Date, Timeline, and so on). Information associated with a common category indicator may be attributed to similar characteristics. In an exemplary embodiment where an item is contained in a horizontal row, the row may include cells associated with category indicators (e.g., column headings) that indicate a type of information that may be contained in that column. For example, an item (e.g., a property listing) may include three cells categorized by three category indicators (e.g., Status, Person, Address). Each cell associated with each category indicator may be contain information associated with each category indicator or be formatted by category indicator. For example, a cell associated with a Status column may contain status labels such as "Done," "Working on it," or "Stuck" and may be formatted to present these labels in colors commonly associated with each particular status. The item (e.g., a property listing) may be organized by the category indicators in any way according to preference. For example, the item may contain category indicators in the order of Status, People, then Address. The item may also be organized by Address, People, then Status, and by any other manner according to preference or default. The plurality of distinct tables containing a common category indicator may include two tables having a common column type.

By way of one example, each item (or row of a table), may be organized by category indicators (e.g., column headings) as shown in FIG. 3. For example, each item (Tasks 1-4) of "This Week" table 301 includes category indicators (e.g., column headings) "Owner" 316, "Status" 318, "Date" 320, "Priority" 322, and "Time Est." 324. Each item (Task 5) of "Next Week" table 311 includes category indicators (e.g., column headings) "Owner" 316, "Status" 318, "Date" 320, "Priority" 322, and "Time Est." 324.

By way of another example, items in two tables may have a common category indicator (e.g., column heading) in a common interface (e.g., two distinct tables as table groupings) in FIG. 3. As illustrated in this example, each item of "This Week" table 301 and "Next Week" table 311 contains five columns in common with common category indicators (e.g., column headings), namely, "Owner" 316, "Status" 318, "Date" 320, "Priority" 322, and "Time Est." 324. Some other embodiments of distinct tables may include different combinations and numbers of columns and category indicators, but may similarly share a common category indicator.

By way of one example, distinct tables of board 300 may contain cells for holding values as shown in FIG. 3. As further illustrated in this example, cells are defined by intersections of vertical rows (columns) and horizontal rows. The values represented in the cells may include alphanumeric item designations, graphical information, dates such as illustrated in "Date" 320, times as illustrated in "Time Est." 324, and combinations of graphics as alphanumerics. In one embodiment, in an item which may be an assigned task, may have a "status" cell containing alternative designation values such as "done", "stuck", "working on it", or any other alphanumeric value that conveys information.

Aspects of this disclosure may include generating a graphical representation of a plurality of variables within the plurality of cells associated with a common category indicator. A graphical representation may include a chart, graph, symbol, illustration, picture, or other visualization to visibly depict quantitative or qualitative data. The data may be information contained in a plurality of cells associated with a common category indicator as previously discussed above. A graphical representation may include, for example, a pie chart, line graph, bar chart, a depiction of an object (e.g., a battery) or any other type of visualization depicting data. A graphical representation may also include a table. In some embodiments, graphical representations may be static or dynamic (e.g., updated and synced to changes made in data in an underlying table). Graphical representations may also be animated. For example, a graphical representation may include a visual representation of moving objects that each represent particular items in a table or tables. In some embodiments, graphical representations may be interactive, as further discussed below.

A plurality of variables within the plurality of cells associated with the common category indicator may include information, data, or values within cells of a common column. For example, in one embodiment, a graphical representation may be a chart of plurality of variables within the plurality of cells associated with the common category indicator (a bar chart with bars representing values in a common category indicator (e.g., column heading), e.g., A bar graph depicting the number of "Done" and "Incomplete" statuses of assignments).

Figure 4:
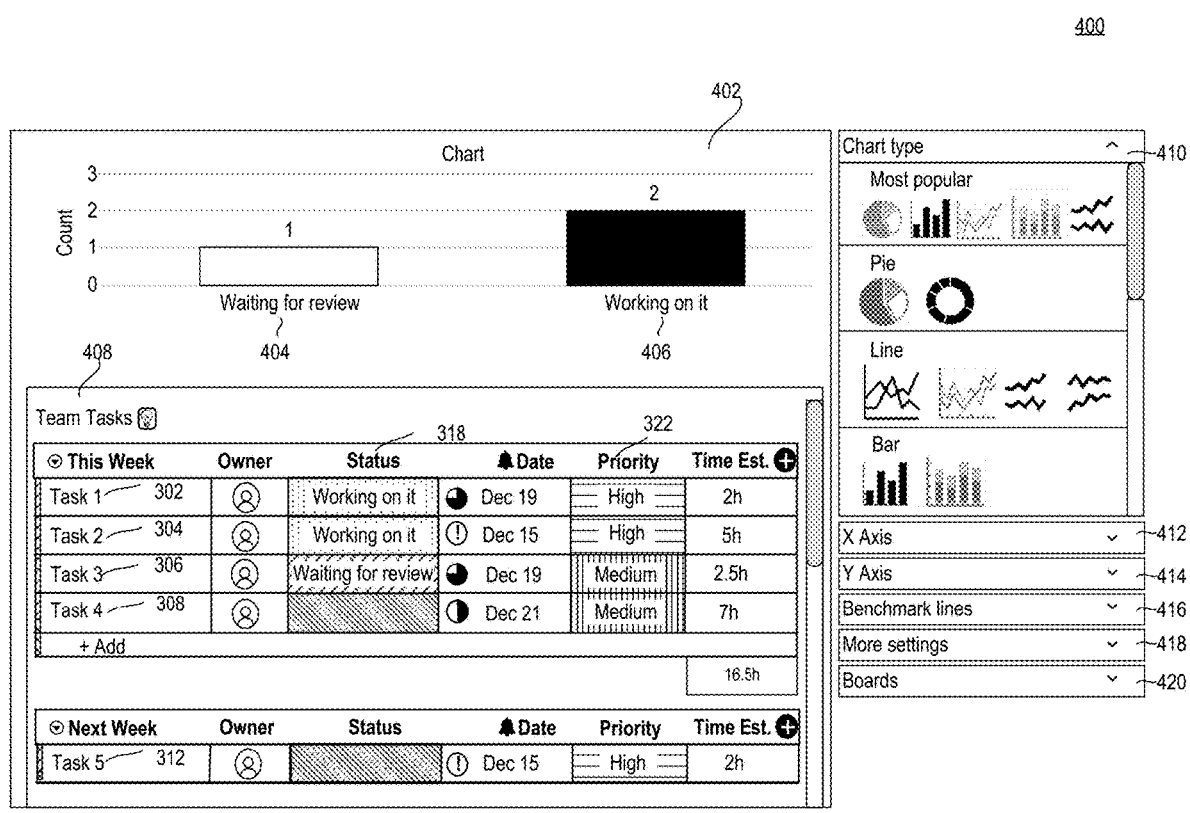
FIG. 4 illustrates an example of an interface for enabling a user to select various prompts in generating an aggregated display of a plurality of items dissociated from differing source tables, consistent with some embodiments of the present disclosure.

By way of one example, a graphical representation may include chart 402 of FIG. 4. As illustrated in this example, interface 400 depicts chart 402 which includes variables (working on it/waiting for review) within the plurality of cells associated with the common category indicator "Status" 318. Chart 402 depicts one task with a "waiting for review" status shown in the "waiting for review" bar 404 of the bar chart. Chart 402 also depicts two tasks with "working on it" status shown in the "waiting for review" bar 404 of the bar chart.

Aspects of this disclosure may involve a graphical representation including a plurality of sub-portions, each sub-portion representing a differing variable of the common category indicator. A graphical representation may include a chart or graph to visually display quantitative or qualitative data, as previously discussed. A graphical representation may include a pie chart, line graph, bar chart, or any other type of chart or graph depicting data. A plurality of sub-portions may be a part of the graphical representation. For example, if a graphical representation includes a pie chart, a sub-portion may be a "slice" of the pie chart. Similarly, if a graphical representation includes a bar chart, a sub-portion may be a bar of the bar chart. A sub-portion representing a differing variable of the common category indicator may include pieces of the whole graphical representation representing different values or data. For example, if a graphical representation includes a pie chart for differing statuses of a project, one sub-portion may depict "Complete" tasks and another sub-portion of the pie chart may depict "Incomplete" tasks.

By way of one example, a graphical representation may include chart 402 of FIG. 4. As illustrated in this example, interface 400 includes chart 402 with sub-portions (or bars), each sub-portion (bar) representing a differing variable of the common category indicator (status). For example, in chart 402 "working on it" bar 404 and "waiting for review" bar 406 are sub-portions representing the working on it/waiting for review cells in the category indicator "Status" column 318. Chart 402 depicts one task ("Task 3" 306) with "waiting for review" status shown in the "waiting for review" bar 404 of the bar chart. Chart 402 also depicts two tasks ("Task 1" 302 and "Task 2" 304 with "working on it" status shown in the "working on it" bar 406 of the bar chart.

In some embodiments, a chart type selector 410 may enable a user to adapt chart 402 to another chart type (e.g., pie chart, line graph, or any other type of chart or graph depicting data). X-Axis selector 412 enables a user to change the X-axis of chart 402. Changing the X-Axis values will change the represented data in chart 402. Y-Axis selector 414 enables a user to change the Y-axis of chart 402. Changing the Y-Axis values will change the represented data in chart 402. Benchmark lines selector 418 enables a user to select various benchmark lines of chart 402. Boards selector 420 enables a user to select different boards and tables to use for underlying data for chart 402. By way of another example, a user may select a category indicator/column, such as "Priority" or "Date," to update chart 402 to present information from cells of those column.

Aspects of this disclosure may include receiving a selection of a sub-portion of the graphical representation. A selection of a sub-portion may include any action taken by a user (audio, visual, typographical, clicking, cursor hover, a tap on a touchscreen, or any other action/method) to choose any area of the graphical representation. For example, if a graphical representation includes a pie chart with a sub-portion as a "slice" of the pie chart, selecting a sub-portion may include a user clicking on a slice of the pie chart. Additionally, if a graphical representation includes a bar chart and a sub-portion would be a bar of the bar chart, selecting a sub-portion may include a user tapping on a bar of the bar chart. Receiving a selection may include a server or system receiving any indication of a selection as described above.

Figure 5:
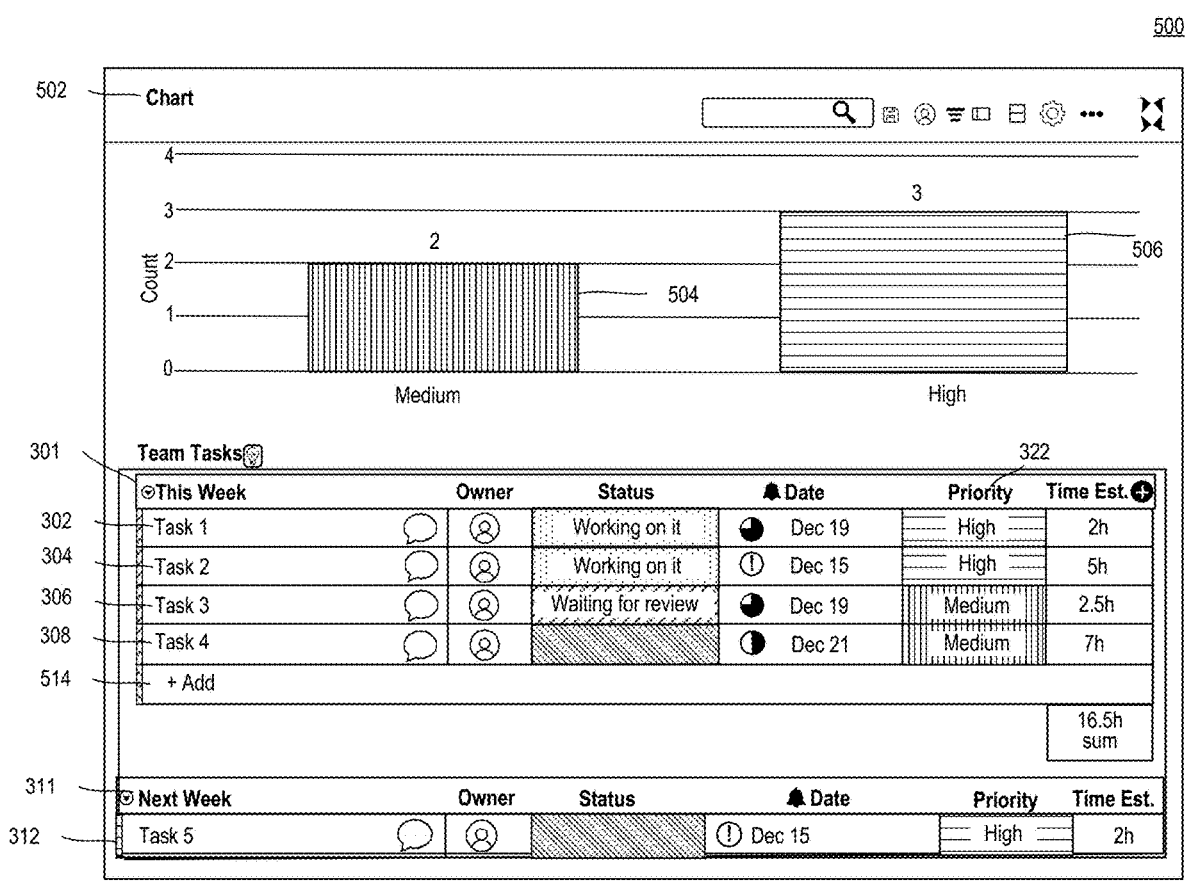
FIG. 5 illustrates a first example of an interface with a graphical representation of a plurality of variables within the plurality of cells associated with the common category indicator, consistent with some embodiments of the present disclosure.

By way of one example, a user may click on the "Priority" category indicator 322 of FIG. 4 in order to update chart 402 from a chart representing status of Tasks to a chart depicting priority of Tasks (as shown in chart 502 of FIG. 5).

Aspects of this disclosure may include performing a look-up across the plurality of distinct tables for a specific variable associated with the received selection. A look-up may include any search function to find a value. A variable associated with the received selection may be any value or label related to a value or label that a user may have selected or generated. For example, if the user selected a "Priority" category indicator, the system may perform a search across multiple tables for values associated with "Priority", e.g., low, medium, and high priority.

Figure 6:
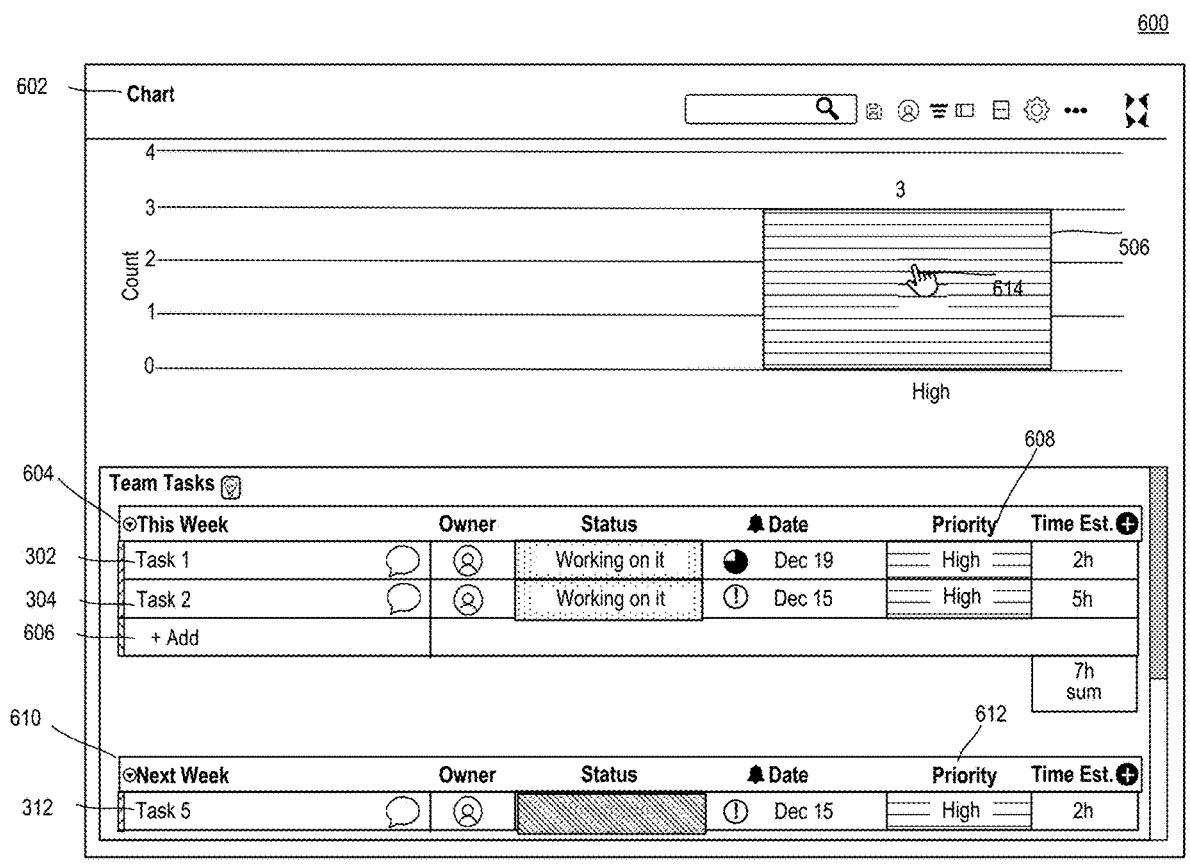
FIG. 6 illustrates a first example of an interface with an aggregated display of a plurality of items dissociated from the differing tables, wherein each displayed item includes the specific variable and variables associated with additional category indicators, consistent with some embodiments of the present disclosure.

By way of one example, if a user selects the "high" bar 506 of bar chart 602 of FIG. 6 with a cursor 614, the system may perform a look-up across many tables, including at least "This Week" table 301 and "Next Week" table 311 of FIG. 5, to identify each instance of "high" in each of the distinct tables.

In some embodiments at least one processor may, based on the look-up, cause an aggregated display of a plurality of items dissociated from the differing tables wherein each displayed item may include the specific variable and variables associated with additional category indicators.

An aggregated display may include a presentation, on an interface, of items combined from two or more separate tables from a single user or a plurality of users. An aggregated display may be in an alphanumeric format, graphical format, or a combination thereof. For example, an aggregated display may include a new table with one item from table A and one item from table B and may generate a new interface showing a separate table (e.g., an aggregated table) from table A and table B. In another example, a system may pull the first row from one table and another row from another table. In one embodiment, for example, table A and table B both need a "status" column or share a similar column in order to aggregate. However, having at least one common column (category indicator) does not necessarily require that the tables have the same column structure. In one embodiment, the system may parse out underlying data from table A and table B in order to generate an aggregated display. A dissociation from differing tables may include taking apart specific parts of one table or graph from other parts of the table or graph. A dissociated table may allow for viewing snippets of one table without the other parts of the table and without original formatting.

As described above, by way of one example shown in FIG. 6, if a user selects the "high" bar 506 of bar chart 602 with cursor 614, the system may perform a look-up across many tables, including at least "This Week" table 301 and "Next Week" table 311 of FIG. 5. Based on the look-up, the system may provide an aggregated display of items. For example, in FIG. 6, aggregated "This Week" table 604 includes original "Task 1" 302 and "Task 2" 304 from the table of FIGS. 3 to 5 but dissociated from the "This Week" table 301 of FIGS. 3 to 5. Further, aggregated "Next Week" table 610 includes original "Task 1" 302 and "Task 2" 304 from the table of FIGS. 3 to 5 but dissociated from the "This Week" table 301 of FIGS. 3 to 5. In yet another example, the aggregated display of items may be an updated chart.

Aspects of this disclosure may include at least one processor configured to receive selections of multiple sub-portions of the graphical display and perform a look-up across the plurality of distinct tables for specific variables associated with the received selections. Receiving selection of multiple sub-portions may be carried out consistent with some embodiments as previously discussed. For example, in one embodiment, a user may seek to view multiple portions of a graphical display (e.g., a pie chart), including the "medium" and "high" priority items within the "low," "medium," and "high" priority projects. In another example, a user may seek to view "Done" AND "Stuck" projects. Or, in another example, a user may seek to view "Done" OR "Stuck" projects.

In some embodiments, the aggregated display includes a new table different from each of the distinct tables. In some other embodiments, the aggregated display may include a graphical indicator based on a percentage makeup of a characteristic of the plurality of items. By way of one example, an interface may depict a graphical representation of a percentage (e.g., pie chart) to show what percentage makeup of "Stuck" tasks belong to each team member, or any other characteristic.

In an exemplary embodiment shown in FIG. 6, aggregated "This Week" table 604 and "Next Week" table 610 are entirely new tables that are different from the underlying tables the items were originally drawn from ("This Week" table 301 and "Next Week" table 311 of FIGS. 3 to 5). The aggregated table in FIG. 6 for example only shows items that are categorized as having high priority.

In one example, in FIG. 5, chart 502 may display items with a specific variable and variables associated with additional category indicators, such as only showing items that are categorized as having high or medium priority, specific variables associated with the additional category indicator (priority). In another example, aggregated "This Week" table 604 and aggregated "Next Week" table 610 in FIG. 6 only show items that are categorized as having high priority, specific variables associated with the additional category indicator (priority).

In one embodiment, a feedback form may be generated to have employees answer questions. A table may be generated to collect responses each day. Each answer submitted may trigger a new item to be generated on the table for the present day.

Figure 7:
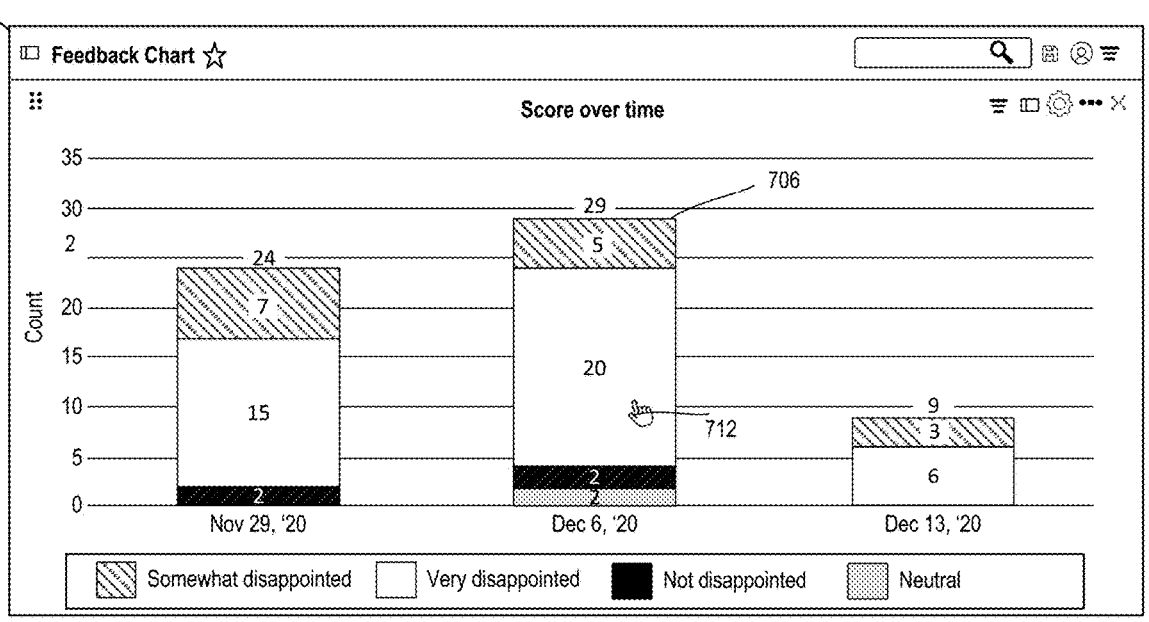
FIG. 7 illustrates a second example of an interface with a graphical representation of a plurality of variables within the plurality of cells associated with the common category indicator, consistent with some embodiments of the present disclosure.

Interface 700 of FIG. 7 depicts Feedback chart 702. Feedback chart 702 is a graphical representation of a plurality of variables within the plurality of cells associated with the common category indicator (Time). Items from multiple tables (one for each day of responses) were collected and grouped into Feedback chart 702. In this case, a user may select the Y-Axis of the Chart to depict the number of answers submitted per day. Feedback chart 702 also depicts a breakdown in each bar of the bar chart which shows answers to a "How do you feel" category. Feedback chart 702 depicts the number of "somewhat disappointed," "very disappointed," not disappointed," and "neutral" answers to the form question. A user may use mouse pointer 712 to click on a portion of the December 6 '20 bar 706 in order to drill down and seek further detailed information on the data that represents the 5 "somewhat disappointed" users 20 "very disappointed" users, the 2 "not disappointed" users, or the 2 "neutral" users.

Figure 8:
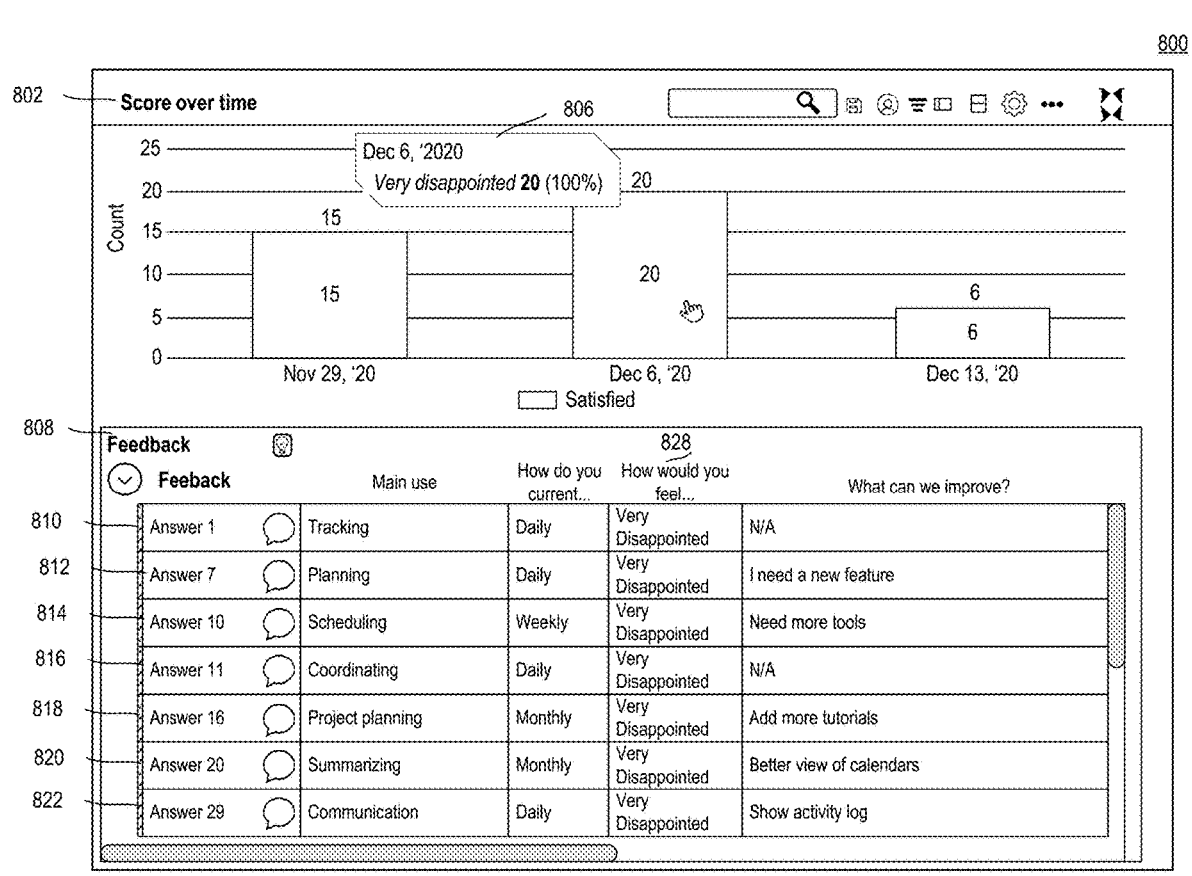
FIG. 8 illustrates a second example of an interface with an aggregated display of a plurality of items dissociated from the differing tables, wherein each displayed item includes the specific variable and variables associated with additional category indicators, consistent with some embodiments of the present disclosure.

After clicking on the "20" "very disappointed" users of December 6 '20 bar 706, interface 800 of FIG. 8 may populate. Simply hovering over the bar may also populate notification 806 with detailed information on the bar. Chart 802 shows an updated version of the data with simply the "very disappointed users" shown on the chart. Additionally, interface 800 includes aggregated display 808 which is table with items categorized by the "How do you feel" category indicator 828 with a "very disappointed" variable pulled items from underlying tables. Aggregated display 808 is dissociated from the underlying/differing tables as it is a completely new table without some data from the underlying tables. Aggregated display 808 includes various answers from users as items 810, 812, 814, 816, 818, 820, 822. Each of these items (answers) share a common category indicator.

According to some embodiments, at least one processor may be configured to receive a sub-selection of the plurality of distinct tables for exclusion from the aggregated display. A sub-selection of the plurality of distinct tables for exclusion may include an identification of a portion or group of data (e.g., at least one item, at least one column, at least one group associated with an entity) from a table that are not to be used or presented, consistent with some embodiments of the disclosure. In one embodiment, a user may select tables or portions or tables to exclude from the aggregated display. In some embodiments, following the received sub-selection, the aggregated display may be caused to change to omit items from the excluded tables. For example, once a user selects tables or portions of tables to exclude from the aggregated display, the aggregated display may update to omit the selected items.

For example, a user may select to exclude "Task 3" 306 of "This Week" table 301 as shown in FIG. 5 from the aggregated "This Week" table 604 of FIG. 6. As a result "Task 3" is excluded from presentation in the table 604 of FIG. 6. By another example, a user may select to exclude "Task 2" 304 of "This Week" table 301 of FIG. 5 from the aggregated "This Week" table 604 of FIG. 6. Upon receiving the selection, the system may update "This Week" table 604 of FIG. 6 to remove "Task 2" 304.

According to some embodiments, at least one processor may be configured to store the selections as a template. A template may include a sample table or board that may already include some details or information in place (such as a fill-in-the-blank form). In one embodiment, a user may be enabled to save the aggregated display view as a new dashboard (e.g., user may want a table aggregating all of the "stuck" items).

By way of one example, "This Week" table 604 and "Next Week" table 610 of FIG. 6 may be saved as a new template or dashboard. Such a template would provide a table with all high priority categorized tasks.

Aspects of this disclosure may include at least one processor that may be further configured to receive a selection to alter one of the plurality of items of the aggregated display. A selection to alter one of the plurality of items of the aggregated display may include any action or indication to update any cell on the aggregated display. Altering may include the addition, modification, or deletion of information contained partially or entirely by an item in order to update any cell. In one embodiment, the system may enable a user to click on a cell of the aggregated table to change a status of an item.

By one example, a user may select the "Status" cell of "Task 2" 304 of aggregated "This Week" table 604 of FIG. 6 in order to change the status from "Working on it" to "Complete." By another example, a user may add items to underlying tables or aggregated tables via, for example, add buttons 310 and 314 of FIG. 3, add button 514 of FIG. 5, and add button 606 of FIG. 6.

Aspects of this disclosure may include outputting a display signal to re-render the aggregated display of the plurality of items in response to the selection to alter one of the plurality of items. A display signal may include any electronic signal or instruction to cause an action that results in a display, rendering, regarding-rendering or projection of information. Re-rendering may include any manner of refreshing, re-displaying, or re-projecting information as a result of an alternation of information. In one embodiment, once a user selects to alter one of the items, the aggregated display may update to display the changes.

For example, a user may select the "Status" cell of "Task 2" 304 of aggregated "This Week" table 604 of FIG. 6 in order to change the status from "Working on it" to "Complete." In response to the selection to change "Working on it" to "Complete," the system may output a display signal to re-render (or update) the aggregated display of the plurality of items.

In another example, if a user changes "Priority" of "Task 2" 304 of aggregated "This Week" table 604 of FIG. 6 from "High" to "Low," then the change would cause the aggregated table to re-render without that changed item because it no longer meets the selection (high priority table).

Figure 9:
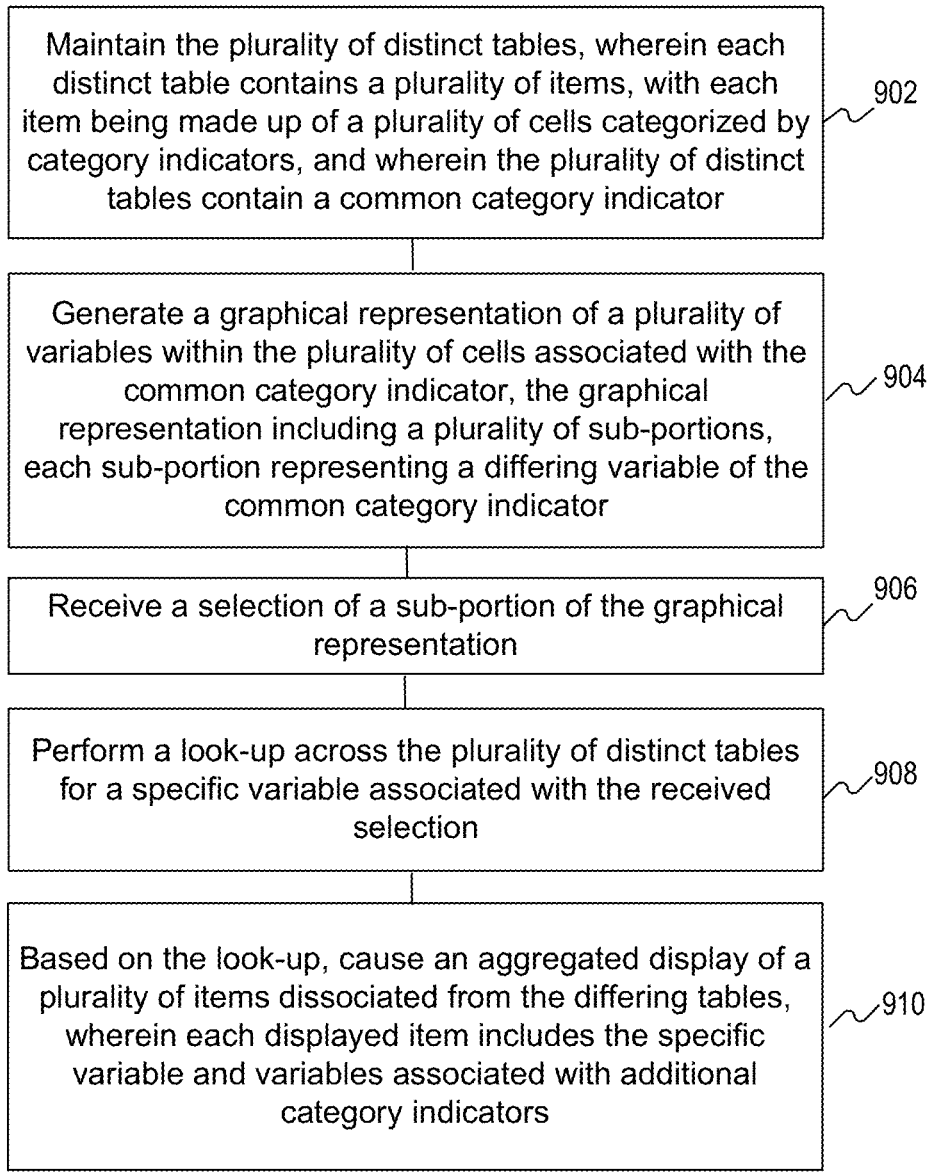
FIG. 9 illustrates a block diagram of method 900 performed by a processor of a computer readable medium containing instructions, consistent with some embodiments of the present disclosure.

FIG. 9 illustrates a block diagram of method 900 performed by a processor of a computer readable medium containing instructions, consistent with some disclosed embodiments. In some embodiments, the method may include the following steps:

Block 902: Maintain the plurality of distinct tables, wherein each distinct table contains a plurality of items, with each item being made up of a plurality of cells categorized by category indicators, and wherein the plurality of distinct tables contain a common category indicator.

In some embodiments, two boards may each include various items with at least a shared category indicator (e.g., Priority column).

Block 904: Generate a graphical representation of a plurality of variables within the plurality of cells associated with the common category indicator, the graphical representation including a plurality of sub-portions, each sub-portion representing a differing variable of the common category indicator. In some embodiments, the system may generate a graphical representation (either a chart or another table) using the cells from different tables that have a shared category indicator (e.g., Priority column).

Block 906: Receive a selection of a sub-portion of the graphical representation. In some embodiments, the system may receive a selection from a user that would like to drill-down or see a specific portion of the graphical representation (e.g., High priority cells of the Priority column).

Block 908: Perform a look-up across the plurality of distinct tables for a specific variable associated with the received selection. In some embodiments, the system may search the various underlying tables for the specific cell value associated with the selection (e.g., high priority cells in different tables).

Block 910: Based on the look-up, cause an aggregated display of a plurality of items dissociated from the differing tables, wherein each displayed item includes the specific variable and variables associated with additional category indicators. In some embodiments, the system may generate a new aggregated table with data of interest from different tables.

Aspects of this disclosure may relate to syncing data between a first platform and a third-party application, including methods, systems, devices, and computer readable media. For ease of discussion, a non-transitory computer readable medium is described below, with the understanding that aspects of the non-transitory computer readable medium apply equally to systems, methods, and devices. For example, some aspects of such a non-transitory computer readable medium may contain instructions that when executed by at least one processor, causes the at least one processor to perform a method via tablature. The term "tablature" may refer to a tabular space, surface, or structure. Such spaces, surfaces, or structures may include a systematic arrangement of rows, columns, and/or other logical arrangement of regions or locations for presenting, holding, or displaying information.

In some embodiments, the system may enable users to connect boards from a first platform for data management to third-party applications and sync data in both directions. To facilitate the exchange, a frame may be opened within the first platform to enable viewing and editing of the third-party application in the third-party application's native format. Then, changes made in the native format may automatically sync to tables sharing that information in the first platform.

Aspects of this disclosure may include accessing a first platform that displays a first set of data in a first format. In some embodiments, a table may involve an arrangement of various cells. The cells may be arranged in horizontal and vertical rows (also referred to as rows and columns). Cells may be defined by intersections of rows and columns. Various rows or columns of the table may be defined to represent different projects, tasks, objects, or other items, as well as characteristics of such items. For example, a horizontal row may represent an item and a vertical row may represent a status (which is a characteristic associated with the item). In some embodiments, the items in the table may be unifying rows or columns that represent projects, tasks, property, people, or any object, action, or group of actions that may be tracked. Additionally, the table, which may also be referred to as a board, include a matrix, or any grouping cells displaying various items. Some examples of items in the table may include workflows, real estate holdings, items for delivery, customers, customer interactions, ad campaigns, software bugs, video production, timelines, projects, processes, video production, inventories, personnel, equipment, patients, transportation schedules, resources, securities, assets, meetings, to do items, financial data, transportation schedules, vehicles, manufacturing elements, workloads, capacities, asset usage, events, event information, construction task progress, or any other objects, actions, group of actions, task, property or persons. A table may be considered distinct from another table if at least one of a row, column, contained information, or arrangement differs from that of another table.

A platform may include an application, system, or other instrumentality that supports or provides functionality. It may include, for example, or set of software with a surrounding ecosystem of resources. In one embodiment, a first platform may be a data management and project management platform. Accessing a platform may include one or more of gaining access to functionality, such as software, retrieving information that enables such access, generating a platform, viewing a platform, or being provided a platform. A set of data may include a collection of qualitative and/or quantitative information. A format may include the way in which something is arranged or set out. For example, the format may be the tabular platform format. A first format may include formatting native to a first platform (such as a data management platform's tablature or table structure). A second format may include the native formatting of a second platform (such as a third-party application's platform's table structure, or any other platform hosting different information).

Aspects of this disclosure may include accessing a second platform that may display a second set of data in a second format. The definitions of a platform, accessing a platform and format, as described above in connection with the first platform applies equally to the second platform. However, the specific functionality associated with each platform may vary. In one embodiment for example, a first platform may be a data management and project management platform, while a second platform may be any third-party application platform. A set of data may include a collection of qualitative and/or quantitative information. In some embodiments, the first and second sets of data may be the same data. In another embodiment, the first and second sets of data may be different data. While a first format of a first platform may be different from a second format of a second platform, the first and second formats of the first and second platforms may also be the same.

In one embodiment, a first format may include formatting native to a first platform (such as a data management platform's tablature), and a second format may include formatting native to a second platform (such as a third-party application's platform's tablature). In some embodiments, the first and second platforms may share the same or similar formats. In another embodiment, the first and second formats may differ.

Aspects of this disclosure may include linking a first set of data with a second set of data to enable migration of the first set of data to the second platform and the second set of data to the first platform. Linking data may include connecting, joining, coupling, or associating one set of data with another set of data. Migration of data may include moving, transferring, or copying of data from one location to another location. In one embodiment, linking data and migrating data may include syncing data via an automation set up by a user on the first or second platforms. The automation may include syncing in both directions (syncing data from the first platform to the second platform as well as syncing data from the second platform to the first platform). While such a system may introduce potential for a loop, the system may include a mechanism to address that issue. For example, where changes have been triggered by the first platform, the system may add an identifier to the change. Then, by checking for the identifier, the system may be notified to not continue into a loop (not trigger another change). For example, if one platform triggers a data change, the system may be configured to stop the loop of repeating the same data change.

Aspects of this disclosure may involve linking a first set of data with a second set of data by including mapping a data type from the first set of data to a data type from second set of data. Mapping may include a process of matching fields from one set of data to another. Mapping may also include a process of creating matching fields between two distinct data models, and/or facilitating data migration, data integration, and other data management tasks. Mapping may occur automatically according to a determination by the system or may occur manually by a user. A data type may include a particular data characteristic, including an indicator of its substance, form, or storage. For example, a characteristic may relate to how data is stored, viewed, and organized. In one embodiment, a data type may refer to any column type in a table. For example, if a change occurs on a first platform, the change may be reflected in the data on the second platform after the linking/mapping occurs. In one embodiment, linking the first set of data with the second set of data may include mapping a data type from the second set of data to a data type from first set of data. For example, if a change occurs on a second platform indicating a change in a project status, the change may be reflected in the data on the first platform after the linking/mapping occurs to reflect a change as a result of the project status change.

In some embodiments, linking a first set of data with a second set of data may occur as a result of an input to a logical sentence structure, wherein at least one processor may be configured, in response to receipt of an input, to regulate a syncing of the second data set with the first data set. An input may include something that is provided or given to a computing device (e.g., when a computer or device receives a command or signal from outer sources such as a user or information update). A logical sentence structure may include a user-defined rule (e.g., an automation) that may perform a logical function that may depend on a condition being met. Regulating may include controlling or maintaining a syncing. Syncing of data may include a transfer of data between two or more locations (e.g., platforms) so that one or both contains overlapping information with the other. Syncing may preferably occur continuously. In some other embodiments, syncing may be triggered by certain actions or may occur periodically.

Figure 10:
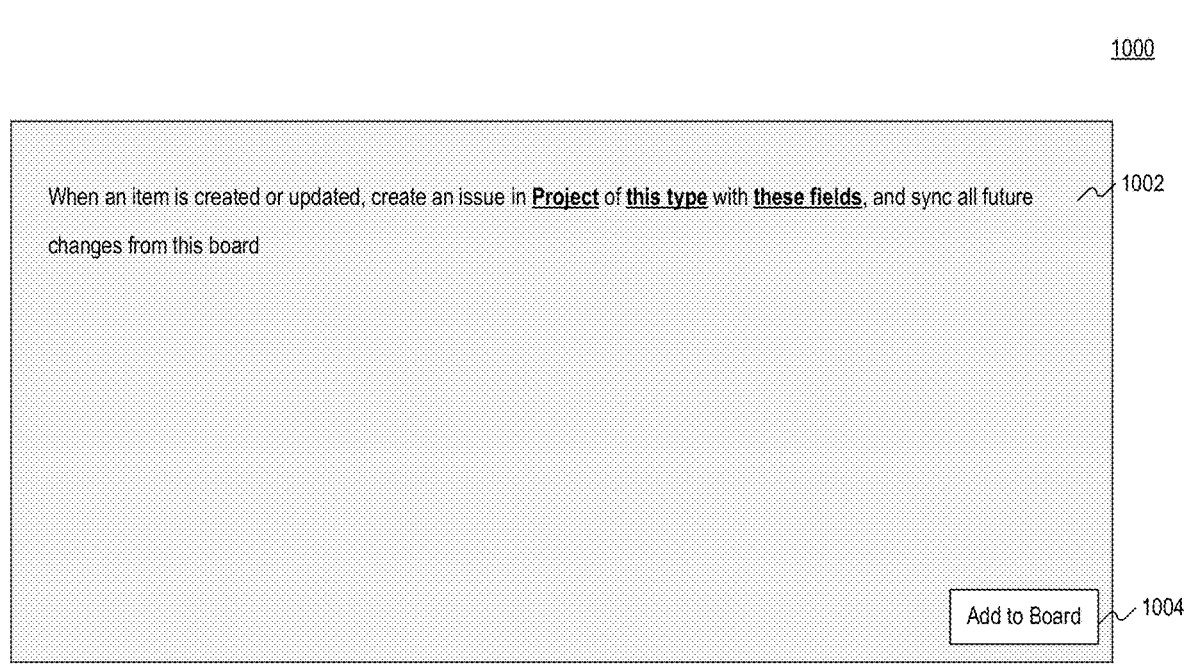
FIG. 10 illustrates an example of an interface with a user-defined automation for syncing data between a first platform and a second platform (third-party application), consistent with some embodiments of the present disclosure.

FIG. 10 illustrates an example of an interface with a user-defined automation for syncing data between a first platform and a third-party application (e.g., a second platform). Interface 1000 of FIG. 10 depicts logical sentence structure 1002. As shown in FIG. 10, logical sentence structure 1002 is a user-defined rule that may perform a logical function. The user may click on the "Add to Board" button 1004 to save the logical sentence structure 1002 and have the system perform the associated logical function. Specifically, logical sentence structure 1002 of FIG. 10 provides, "when an item is created or updated, create an issue in Project (e.g., a user selected project/board/table) of this type (e.g., a user-selected type) with these fields (e.g., a user-selected field as shown in FIG. 11), and sync all future changes from this board."

In another embodiment, the logical sentence structure may provide, "sync all changes from this board," and all cells may be linked with the current fields from the second platform and any future changes may also be linked. Other exemplary logical sentence structures may include "sync all changes from [Board A of internal platform] to fields from [third-party application]," "sync some changes from [Board A of internal platform] to fields from [third-party application]," "sync all changes between [Board B of internal platform] with fields from [third-party application] and [second third-party application]," "sync some changes between [Board A of internal platform] with fields from [third-party application]," and more. Syncing may be dependent on an item being added/updated to a board, a time of day, a date, or any event that may occur. Portions of logical sentence structures may be user-selected. For example, the user may select "Project" to be a certain board, "type" to be a certain column style, and "fields" to be particular fields.

Figure 11:
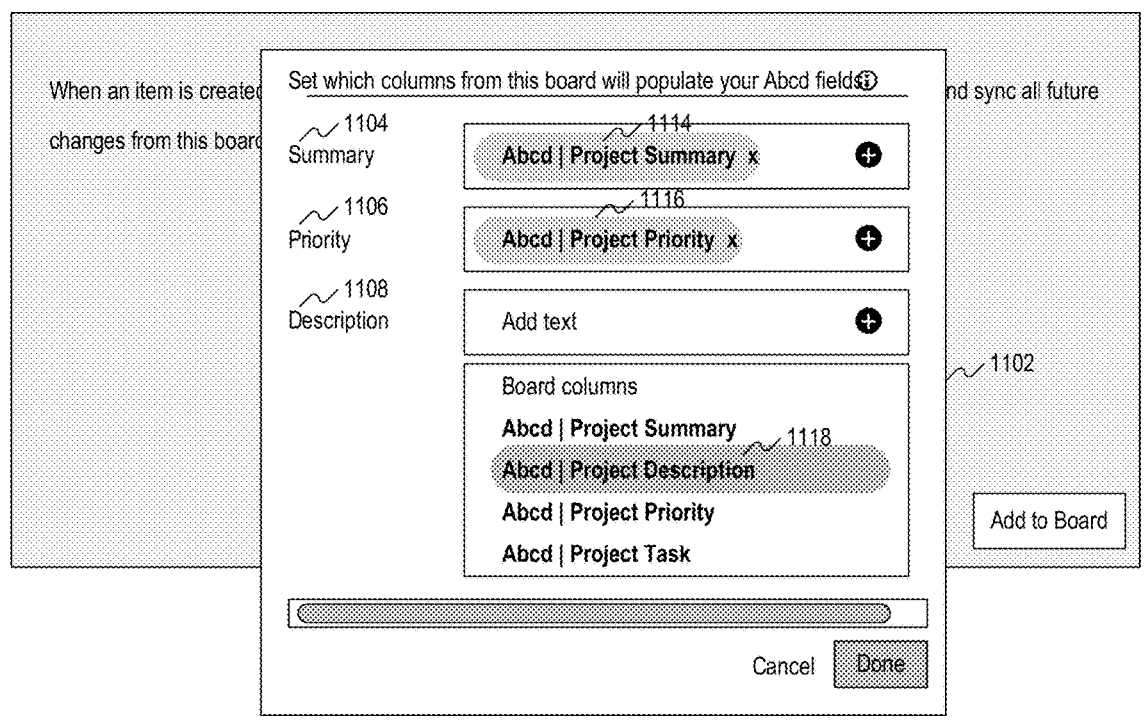
FIG. 11 illustrates an example of an interface for selecting fields of the user-defined automation of FIG. 38-1, consistent with some embodiments of the present disclosure.

By way of one example, FIG. 11 illustrates an embodiment of an interface for selecting fields of the user-defined automation of FIG. 10. Interface 1100 of FIG. 11 depicts selection interface 1102 where a user may select the "fields" from logical sentence structure 1002 (e.g., an automation). As shown in FIG. 11, a user may select particular columns from the board (fields associated with a column of the first platform) that will populate in a third-party application and vice versa (fields from the third-party application that will populate fields of the first platform) for two-way syncing. Logical sentence structure 1002 provides "When an item is created or updated, create an issue in Project (already selected by the user) of this type (already selected by the user) with these fields (in selection process using selection interface 1102 of FIG. 11), and sync all future changes from this board." Specifically, the user-selected cells of Summary 1104 of the first platform may populate in the cells of "Abcd Project Summary" 1114 of the second platform during syncing, and cells of "Abcd Project Summary" 1114 of the second platform may populate in the cells of Summary 1104 of the first platform during syncing. Additionally, the user-selected cells of Priority 1106 of the first platform may populate in the cells of "Abcd Project Priority" 1116 of the second platform during syncing, and cells of "Abcd Project Priority" 1116 of the second platform may populate in the cells of Priority 1106 of the first platform during syncing. Further, when a user selects the cells of Description 1108 of the first platform, those selected cells of Description 1108 may populate the cells of "Abcd Project Description" 1118 of the second platform during syncing, and cells of "Abcd Project Description" 1118 of the second platform may populate the cells of Description 1108 of the first platform during syncing.

In one embodiment, when defining particular fields to use (e.g., mapping) from one platform to another platform, a user may select multiple columns from a first platform's table to combine into a column in a second platform (or vice-versa). For example, a user may insert "(Summary cell value)–(Priority cell value)" into the "Project Summary" column of the second platform (e.g. "Summary 1-High" may populate in the second platform).

Figure 12:
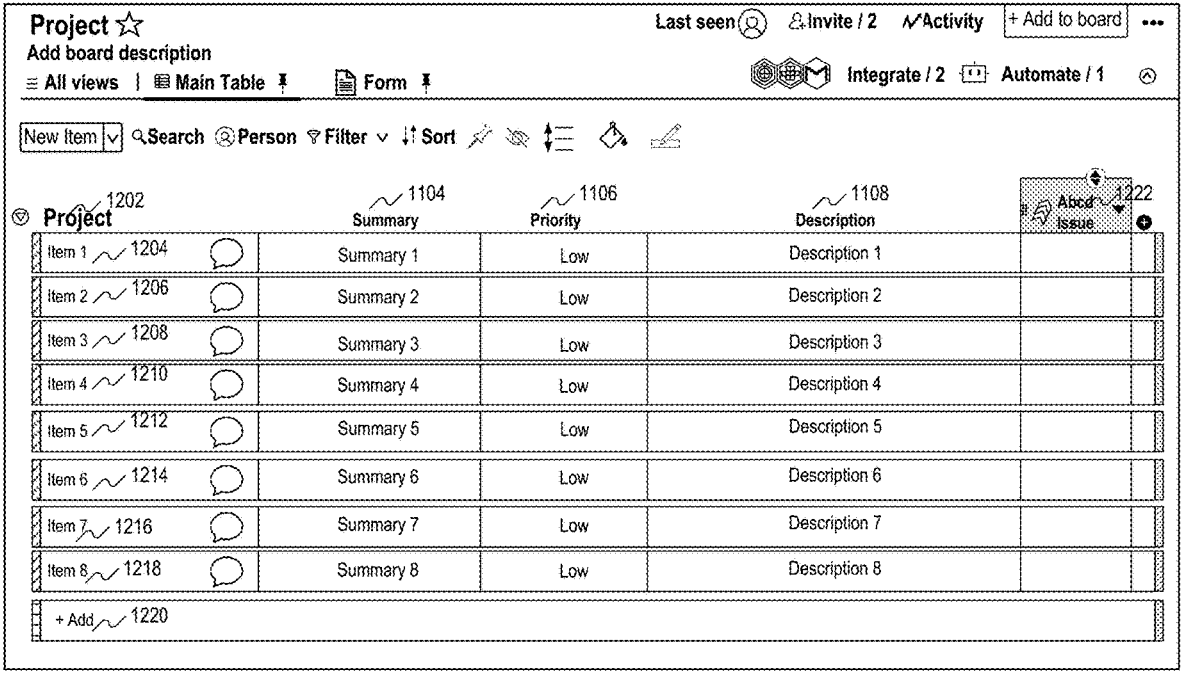
FIG. 12 illustrates an example of an interface with a new table on a first platform which may link and migrate a first set of data from the first platform with a second set of data from a second platform, consistent with some embodiments of the present disclosure.

By way of one example, FIG. 12 illustrates an embodiment of an interface with a new table on a first platform which may link and migrate a first set of data from the first platform to a second set of data from a second platform. Interface 1200 of FIG. 12 depicts board 1202 within the first platform displaying a first set of data. The data may include information contained in the cells of columns associated with Summary 1104, Priority 1106, and Description 1108. Board 1202 includes eight items: "item 1" 1204, "item 2" 1206, "item 3" 1208, "item 4" 1210, "item 5" 1212, "item 6" 1214, "item 7" 1216, and "item 8" 1218. Board 1202 further includes "Add Button" 1220 to add new items to the board. Board 1202 also includes "Abcd issue" column 1222 because logical sentence structure 1002 of FIG. 10 indicated the system may generate an issue in board 1202 (Project) when an item is created or updated.

FIG. 13 illustrates an example of an interface 1300 where a user may add a new item to thereby enable alteration of a second set of data in a second platform through manipulation of the interface of data in the first platform (e.g., the platform containing interface 1300). Interface 1300 of FIG. 13 depicts a board 1202 within the first platform displaying a first set of data. The first set of data is slightly modified from the first set of data presented on interface 1200 of FIG. 12 in that interface 1300 includes New Item 1302 as a result of selecting the "add" button 1220 of FIG. 12.

The cells associated with New Item 1302 are populated ("Summary" cell is filled with "Summary 9," "Priority" cell is filled with "High," and the "Description" field is filled with "Description 9").

Figure 15:
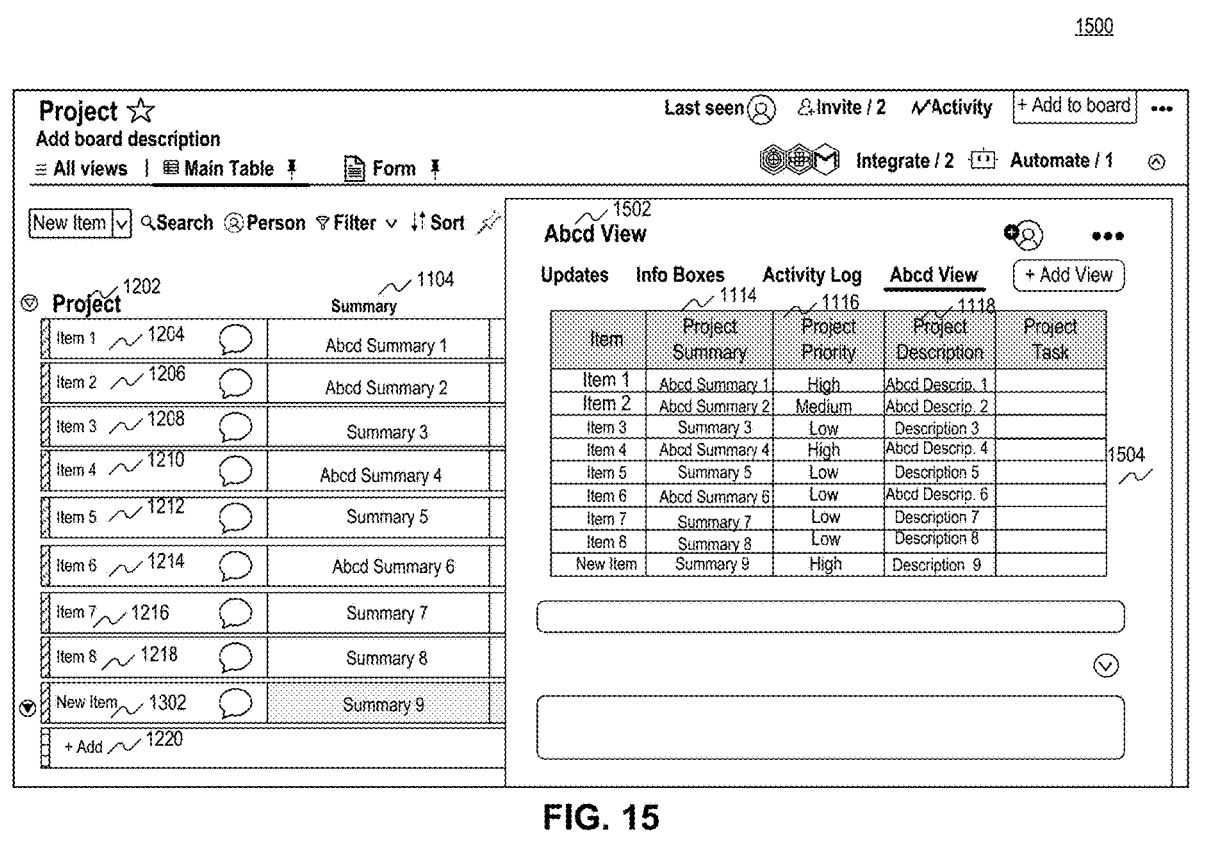

Once cells of "New Item" 1302 are changed or updated, the changes are synced to the third-party application (e.g., altering the second set of data in the second platform as a result of altering data in the first platform). Data in the cells of "New Item" 1302 through "Summary," "Priority," and "Description" cells may be linked and migrated with Abcd (e.g., a synced third-party platform or application). Accordingly, the data in second platform (Abcd) and the first platform may be synchronized for information contained in "New Item" 1302. FIG. 13 and FIG. 15 portray a migration of the first set of data to the second platform.

Aspects of this disclosure may include enabling a first platform to simultaneously display a second set of data in a second format. Simultaneously displaying data may include presenting information at the same time or near same time. In one embodiment, a first platform may display a first set of data in a first format at the same time as the second platform displaying the second set of data in the second format by designating a portion of a display for the first platform and a different portion of a display for the second platform. The displays of the first and second platforms may be completely distinct, or one platform may partially or completely be presented over the other platform in the display. For example, the first and second platforms may be simultaneously displayed with an evenly split presentation in a display. In another example, the first platform may be displayed in the background while the second platform may be displayed as an iframe or smaller window that overlays the presentation of the first platform.

FIG. 13 illustrates an example of an interface for providing a hyperlink to cause a presentation of a frame (e.g., an iframe or window) of the second platform within the first platform. Interface 1300 of FIG. 13 depicts board 1202 within the first platform displaying a first set of data. In the "Abcd Issue" column 1222, hyperlink 1304 provides a link to the second platform (e.g., Abcd). The hyperlink may provide a frame 1502 of the second platform within the first platform to simultaneously display the second set of data in the second format and the first set of data in the first format as shown in FIG. 15.

Figure 14:
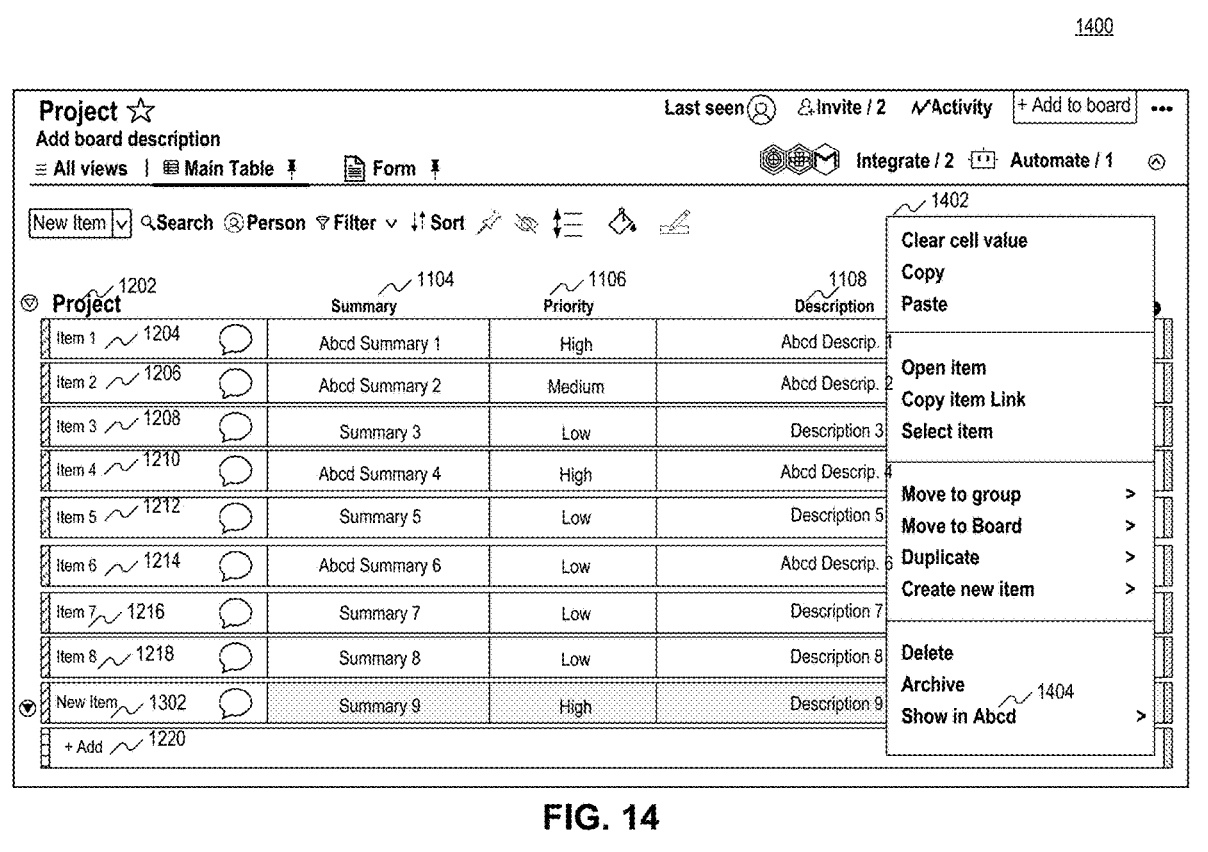

FIG. 14 illustrates an example of an interface with a first option to provide a frame of the second platform within the first platform. Interface 1400 of FIG. 14 depicts board 1202 within the first platform displaying a first set of data and a menu 1402 for selection. Menu 1402 includes a "Show in Abcd" option 1404 for selection. If a user selects "Show in Abcd" option 1404, the system may then provide a frame (e.g., an iframe or window) of the second platform (e.g., Abcd) within or on top of the first platform to simultaneously display data from the first and second platforms, as shown in FIG. 15.

Furthermore, data from board 1202 of FIG. 14 (e.g., data of a first platform) has been updated and synced (linked and migrated) with the data from Abcd (e.g., a second platform). Specifically, "item 1" 1204 of FIG. 14 includes updated data that is different from data in the original "item 1" 1204 of FIG. 12. Data contained in cells of "item 1" 1204 for the "Summary," "Priority," and "Description" cells have been updated because of a synchronization with data contained in Abcd (same for "item 2" 1206, "item 4" 1210, and "item 6" 1214). Accordingly, the data in second platform (Abcd) and the first platform are matching as a result of the synchronization. Thus, FIG. 14 portrays a migration of the second set of data to the first platform.

Aspects of this disclosure may involve enabling a first platform to simultaneously display a second set of data in a second format including providing a frame within the first platform in which the second platform is displayed. A frame may include an iframe, window, pop-up, module, or any other display structure or format. Aspects of this disclosure may include that the frame is an iframe. An iframe may include an in-line frame or a floating frame which may appear on a presentation in a display and enable new presentations of information to be opened within (and appearing on top of) a main platform (e.g., a main page or application). In one embodiment, a system may link two different platforms that may display data differently. The two platforms may share data, but the data need not be identical. A user in platform A may make a "call" or send a request to view or access the data from platform B. The data may be displayed on top of platform A in a shared or common view. The shared view may be a pop-up window, a card view on the screen, a split screen, or in any other format. Rules may be implemented on the first platform through automations and integration logic sentences. These rules may connect the data between the two different platforms by synchronizing the data between the platforms in response to a condition being met (e.g., when an alteration to information contained in a cell is detected). Data from an external source (e.g., the second application or platform) may be simultaneously visible with the data of the first platform. In another aspect of the disclosure, the system may be implemented by using a column (e.g., of a first platform) that stores links in each cell that lead to a third-party web page or platform (e.g., the second platform). Clicking on the link might not necessarily retrieve a separate page of the second platform; instead, a view of the third-party software may open from the first platform, on the first platform or otherwise simultaneously with the first platform. Data may be synced in both directions between the first platform and the second platform or just in a single direction. In some embodiments (e.g., such as stock market data), there may be a one-way synchronization configuration where the system merely pulls data from the second platform into the first platform.

FIG. 15 illustrates an example of a presentation of an interface with a frame of a second platform within/on top of a first platform. Interface 1500 of FIG. 15 depicts a presentation of board 1202 within the first platform and depicts a presentation of iframe 1502 with a second platform table 1504 (e.g., a Abcd table or any other third-party application displaying the second set of data in a second format). The iframe 1502 may contain the second platform within or on top of the first platform in the display as shown in FIG. 15. Data from board 1202 and Abcd table 1504 are synced. Any update of Abcd table 1504 will update board 1202 and any update of board 1202 will update Abcd table 1504 within interface 1500 (and in other applications where both sets of data are displayed individually).

Aspects of this disclosure may include enabling alteration of a second set of data in a second platform through manipulation of a simultaneous display of the second set of data in a first platform. Alteration of data may include modifying or updating any information through addition, destruction, rearrangement, or a combination thereof. Manipulation of a simultaneous display of data may include the use of or interaction with an interface presenting information from one or more platforms or applications at the same or near same time. In one embodiment, enabling alteration of the second set of data may include changing the third-party data from within the third-party application by manipulating the third-party application data while operating from the first platform or application.

By way of one example with regards to FIG. 15, a user may alter data in an exemplary Abcd table 1504 (e.g., a second platform) and enable alteration of information contained on board 1202 (e.g., data from a first platform). The user may further alter data of board 1202 and enable alteration of Abcd table 1504 within interface 1500 of the first platform (and on other webpages or applications where both sets of data are displayed individually).

Some embodiments may involve enabling alteration of a second set of data in a second platform through manipulation of a simultaneous display of the second set of data in a first platform including enabling editing within the frame. Editing within a frame may include modifying, correcting, or otherwise changing (e.g., adding, subtracting, rearranging, or a combination thereof) information inside the bounds of an iframe, window, pop-up, module, or any other frame of a platform or application. In one embodiment, a user may change data in a third-party application pop-up or portal within a first platform. As a result, the system may update the corresponding data on the second platform.

FIG. 13 illustrates an example of an interface of the first platform with a hyperlink 1304 to provide a frame of the second platform within the first platform as shown in FIGS. 14 and 15 and as previously discussed above. Clicking on the connection link may open a frame of the integrated third-party on top of the first platform. The user may edit in both platforms simultaneously and cause both platforms to be updated or otherwise synchronized in real-time. An edit in the first platform may result in a corresponding edit in the third-party platform (second platform), which maybe viewable on the open frame presenting the first platform. In another embodiment, clicking on the connection link may open a frame of the integrated third-party (e.g., the second platform) separately from the first platform.

Some embodiments may involve, in response to receiving an alteration, syncing a second set of data as altered via a first platform with a first data set. Receiving an alteration may include the system receiving a signal or request indicative of any change in an interface of an application or platform. Syncing may include a process of establishing consistency among data from a source to a target data storage and vice versa and the continuous harmonization of the data over time. For example, syncing may involve a duplication of a first set of data to a second set of data when a modification is detected in the first set of data. In another example, syncing may involve copying the alteration itself (e.g., a deletion action) and applying it to the unmodified data once the alteration is detected. In one embodiment, data may be synced in both directions between the first platform and the second platform. In some other embodiments, the system may include just one-way syncing between the first and second platforms where the system may merely pull data from one platform to the other by transferring information of copying information.

Aspects of this disclosure may include, while the second platform may be simultaneously displayed, exporting changes made to a first set of data to a second platform such that the simultaneous display of a second set of data is updated in real time. Simultaneous display may include the presentation of information from multiple sources at the same time as previously discussed above. Exporting changes may include taking newly altered data from one application or computer system to another through copying and replacing original data with the newly altered data or transferring the alteration to apply the same to unaltered data. Updating in real time may include providing the latest updated information at the same time or near same time when an update is made. In some embodiments, changes in data are updated in real-time.

By way of one example in FIG. 15, any update of Abcd table 1504 will update board 1202 in real-time and any update of board 1202 will update Abcd table 1504 in real-time within interface 1500.

Figure 16:
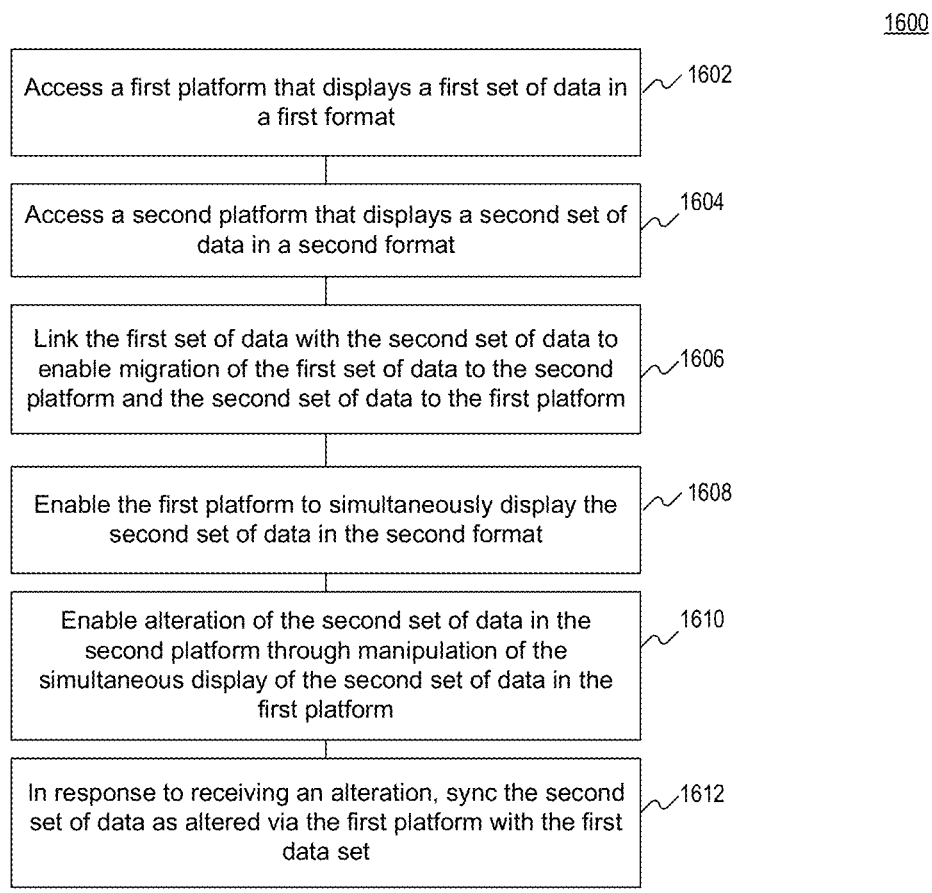
FIG. 16 illustrates a block diagram of a method performed by a processor of a computer readable medium containing instructions, consistent with some embodiments of the present disclosure.

FIG. 16 illustrates a block diagram of method 1600 performed by a processor of a computer readable medium containing instructions, consistent with some disclosed embodiments. In some embodiments, the method may include the following steps:

Block 1602: Access a first platform that displays a first set of data in a first format. In some embodiments, a user may access a data management platform and view data in a first format (native format of data management platform).

Block 1604: Access a second platform that displays a second set of data in a second format. In some embodiments, a user may access a third-party platform and view another set of data in a second format (native format of third-party platform).

Block 1606: Link the first set of data with the second set of data to enable migration of the first set of data to the second platform and the second set of data to the first platform. In some embodiments, the system may connect link both sets of data to allow for two-way syncing of the data between the two platforms.

Block 1608: Enable the first platform to simultaneously display the second set of data in the second format. In some embodiments, the data management platform may display the second set of data in the second format (native format of the third-party application) by using an iframe.

Block 1610: Enable alteration of the second set of data in the second platform through manipulation of the simultaneous display of the second set of data in the first platform. In some embodiments, the user may alter the second set of data in the third-party application via the iframe presented in the data management platform.

Block 1612: In response to receiving an alteration, sync the second set of data as altered via the first platform with the first data set. In some embodiments, the system may sync the data among both platforms upon receiving the alteration via the iframe presented in the data management platform.

Aspects of this disclosure may relate to a workflow management system for triggering table entries characterizing workflow-related communications occurring between workflow participants, including methods, systems, devices, and computer readable media. For ease of discussion, a system is described below, with the understanding that aspects of the system apply equally to non-transitory computer readable media, methods, and devices. For example, some aspects of such a system may include at least one processor configured to perform a method via tablature. The term "tablature" may refer to a tabular space, surface, or structure. Such spaces, surfaces, or structures may include a systematic arrangement of rows, columns, and/or other logical arrangement of regions or locations for presenting, holding, or displaying information. The system may include a data management platform with integrated communication capabilities (e.g., Zoom call functionality). The data management platform may log communications (external or external calls) within the data management platform. For example, when a communication session is scheduled or when a communication session ends, the data management platform's system may generate a new row in a table, memorializing the communication session and displaying any metadata associated with and/or stored from the communication session.

Aspects of this disclosure may include presenting a table via a display, the table containing rows and columns defining cells, the rows and cells being configured to manage respective roles of the workflow participants. A table may be an organized collection of stored data. For example, a table may include a series of cells. The cells may be arranged in horizontal and vertical rows (also referred to as rows and columns). Cells may be defined by intersections of rows and columns. Various rows or columns of the table may be defined to represent different projects, tasks, objects or other items, as well as characteristics of such items. For example, a horizontal row may represent an item and a vertical row may represent a status (which is a characteristic associated with the item). In some embodiments, the items in the table may be unifying rows or columns that represent projects, tasks, property, people, or any object, action, or group of actions that may be tracked. Additionally, the table, which may also be referred to as a board, may include a matrix, or any grouping cells displaying various items. Some examples of items in the table may include workflows, real estate holdings, items for delivery, customers, customer interactions, ad campaigns, software bugs, video production, timelines, projects, processes, video production, inventories, personnel, equipment, patients, transportation schedules, resources, securities, assets, meetings, to do items, financial data, transportation schedules, vehicles, manufacturing elements, workloads, capacities, asset usage, events, event information, construction task progress, or any other objects, actions, group of actions, task, property or persons. A table may be considered distinct from another table if at least one of a row, column, contained information, or arrangement differs from that of another table. A display may include any interface such as a graphical user interface, a computer screen, projector, or any other electronic device for a visual presentation of data. At least one processor may be configured to present a table via a display if at least one processor outputs signals which result in a table being presented via the display. Workflow participants may include any individuals or entities associated with a communication session. For example workflow participants may include individuals scheduled to be on a call, individuals who were actually on the call, a host of a call, or any other entity associated with the call (e.g., a conference call ID for a group of individuals).

Figure 17:
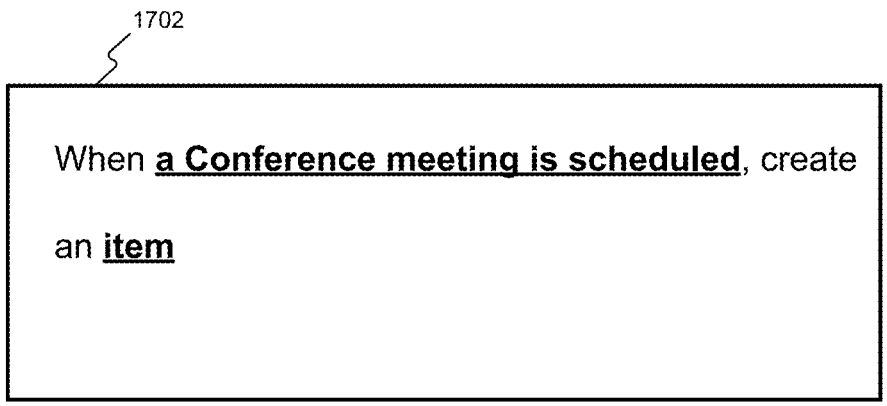
FIG. 17 illustrates a first example of an interface enabling a user to select various prompts to associate a communications rule with a cell and trigger table entries characterizing workflow-related communications occurring between workflow participants, consistent with some embodiments of the present disclosure.
Figure 18:
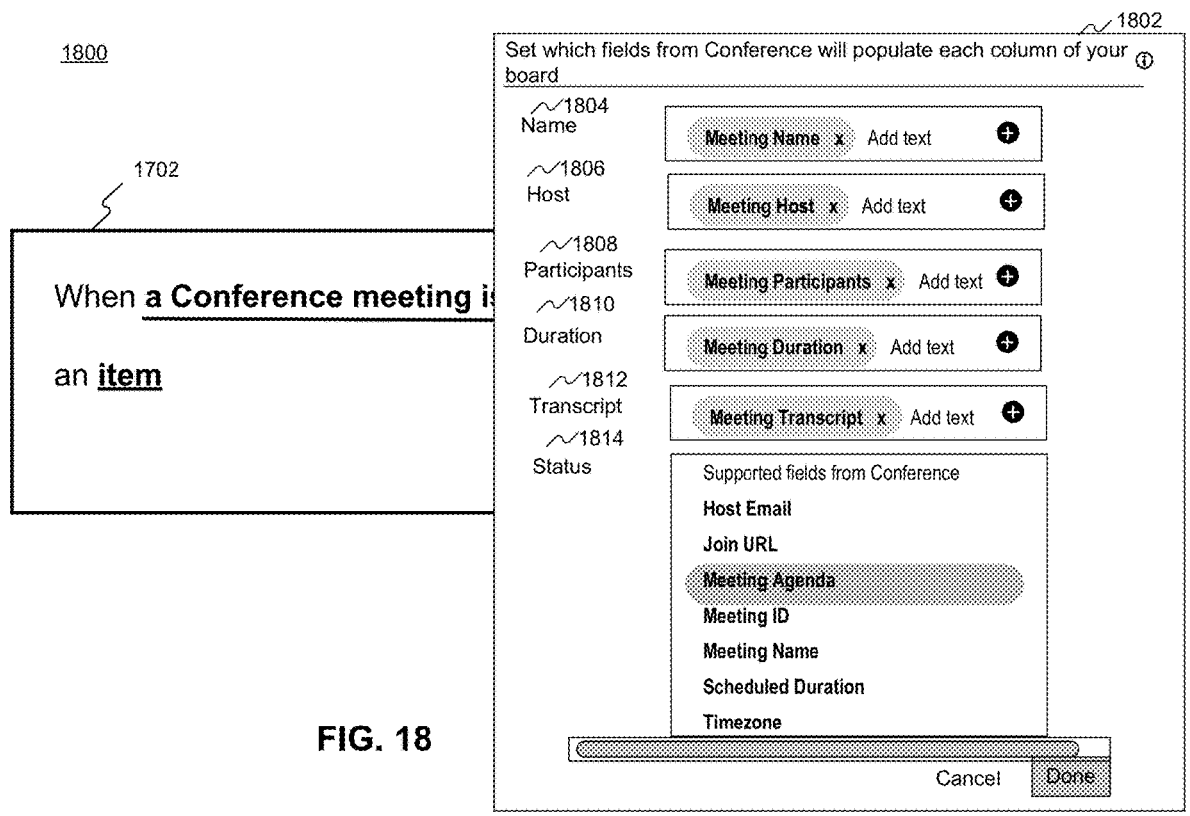
FIG. 18 illustrates a second example of an interface enabling a user to select various prompts to associate a communications rule with a cell and trigger table entries characterizing workflow-related communications occurring between workflow participants, consistent with some embodiments of the present disclosure.
Figure 19:
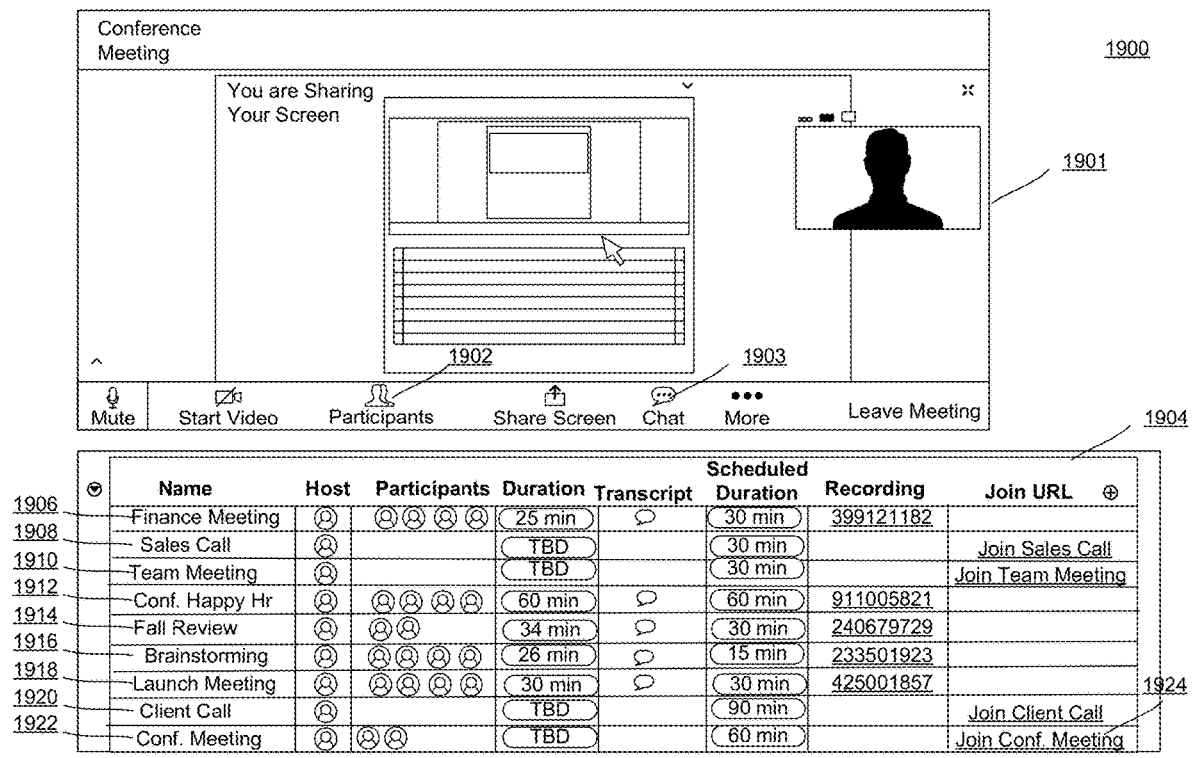
FIG. 19 illustrates an example of an interface with a video communication and a table with an object containing the characteristics of the video communication, consistent with some embodiments of the present disclosure.

By way of one example with respect to FIG. 17 and FIG. 18, a user may define a communications rule (e.g., via an automation) that may interact with a table presented via a display. The communications rule may define how cells of a table may be configured and populated. FIG. 17 and FIG. 18 illustrate an exemplary interface that may enable a user to customize (e.g., by selecting various prompts) to associate a communications rule with a cell and trigger the generation of new table entries or modifying existing table entries to characterize communications that may occur between workflow participants. Specifically, FIG. 17 depicts interface 1700 which includes communications rule 1702 instructing the system to generate a new item (or row) in a table when a Zoom meeting is scheduled. A user may click any condition (e.g., definable variable) of communications rule 1702 in order to further define the rule (e.g., pick options to define the definable variable fields). For example, FIG. 18 illustrates interface 1800 with menu 1802 enabling a user to select various prompts to associate the communications rule with a cell (or multiple cells in a column or row) and trigger the generation of new or modified table entries characterizing workflow-related communications between workflow participants. Specifically, menu 1802 may enable a user to configure specific fields from a video communications platform (such as Zoom) for populating cells or columns of the user's board. In FIG. 18, the user has selected "Meeting Name" to populate cells of a "Name" column 1804 of the user's board (e.g., a board as illustrated in FIG. 19), "Meeting Host" to populate cells of "Host" column 1806, "Meeting Participants" to populate cells of "Participants" column 1808, "Meeting Duration" to populate cells of "Duration" column 1810, and "Meeting Transcript" to populate cells of "Transcript" column 1812. FIG. 18 also illustrated an exemplary interface for the user to select "Meeting Agenda" from a pick list to populate cells of a "Status" column 1814 of the user's board (e.g., a board as exemplified in FIG. 19).

In some embodiments, the table may be configured to track due dates and statuses of items associated with a workflow. Tracking due dates of items may include monitoring or maintaining a log of dates that may be compared to a current date. Tracking statuses of items may include monitoring or maintaining a log of statuses or progress. For example, the system may monitor and track due dates and statuses of items to a current date to determine whether specific items are overdue (e.g., the current date is after a due date and the status is not "done"). In some embodiments, the processor may be configured to associate a communication with a specific one of the items and link an object to the specific one of the items. Associating a communication with an item may include linking a video/audio communication with an item in a table. For example, a communication may include any message such as a graphic, comment, or any annotation that may be stored in a cell that is associated with a particular item. The communication may include a link that may be activated to access an object in a table of the system or to a third-party application. Linking an object to an item may include associating or connecting an object and a row. As with other linking functions described herein, linking an object to an item may occur through computer code that establishes a connection between the object and the item.

By way of one example, objects of item 1922 of FIG. 19 include one specific host, two participants, duration of 'to be determined,' no meeting transcript (because the meeting was live and not completed), a scheduled duration of 60 minutes, no recording link (because the meeting has not been completed), and Active Link 1924 (because the meeting participants may still join the video communication). Each of the objects in this row are associated with item 1922.

Aspects of this disclosure may include presenting on a display at least one active link for enabling workflow participants to join in a video or an audio communication. An active link may include a functioning hyperlink that may be activated or triggered to access data within the system or external to the system. In some embodiments, an active link may include a button that may be activated by a cursor selection, a cursor hover, a gesture, or any other interaction with the button. Presenting at least one active link on a display may include presenting the link as a graphic (e.g., an icon that may be static or animated), as text (e.g., a URL), or any combination thereof. An audio communication may include any transmission of data using technology for the reception and transmission of audio signals by users in different locations, for communication between people in real time (e.g., a phone call via Zoom, Teams, or WebEx). A video communication may include any transmission of data using technology for the reception and transmission of audio-video signals by users in different locations, for communication between people in real time (e.g., a video call via Zoom, Teams, or WebEx).

In some embodiments, the at least one active link may be associated with a particular row in the table. Associating an active link with a row may include linking a functioning hyperlink with an item or row in a table. In another embodiment, the active link may be associated with a particular cell in the table. For example, a system may include linking a functioning hyperlink with a cell or particular row by storing the hyperlink in a particular cell. The hyperlink may be presented in the cell or particular row, or may merely be associated through an automation that activates the hyperlink in response to a condition being met in that particular cell or row.

In some exemplary embodiments, the video or audio communication may be provided via an application linked via an active link. For example, a video or audio communication (such as a Zoom or Teams call) may be provided to a user via a presentation of a hyperlink within a cell of a table. If the user clicks on the hyperlink, the user's display may provide the video or audio communication within the original application (e.g., the application displaying the hyperlink in the table) or in an external application.

Aspects of this disclosure may involve logging in memory, characteristics of a communication including identities of the workflow participants who joined in the communication. Logging in memory may include storing data in a local or remote repository for later access. Characteristics of a communication may include any data or metadata associated with a communication. Non-limiting examples of communication characteristics may include sent text messages, transcripts of conversations, meeting duration, action items, participant IDs, number of messages transmitted by each participant, date and time of the communication, or any other information that may be discerned from a communication or meeting, as discussed further below. Identities of the workflow participants may include any identifying information of people (such as name, image, or email address).

FIG. 19 illustrates an example of interface 1900 with video communication interface 1901 and table 1904 with objects (or cells) containing the characteristics of the video communication. Video communication interface 1901 may include exemplary meeting functions such as "mute," "start video," "participants list" 1902, "share screen," "chat" 1903, "leave meeting," and more. Metadata from "participants list" 1902 and "chat" 1903 may be used to log in memory characteristics of the communication, including identities of the workflow participants who joined in the communication (participant list and chat transcript). The logged characteristics may also be presented in table 1904.

Table 1904 includes rows and columns defining cells, the rows and cells being configured to manage respective roles of the workflow participants. Specifically, table 1904 includes item 1906 relating to characteristics of a "Finance Meeting" communication, item 1908 relating to characteristics of a "Sales Call" communication, item 1910 relating to characteristics of a "Team Meeting" communication, item 1912 relating to characteristics of a "Zoom Happy Hour" communication, item 1914 relating to characteristics of a "Fall Review" communication, item 1916 relating to characteristics of a "Brainstorming" communication, item 1918 relating to characteristics of a "Launch Meeting" communication, item 1920 relating to characteristics of a "Client Call" communication, and item 1922 relating to characteristics of a "Zoom Meeting" communication. Each of these items may have been generated at the start, end, or during a communication (e.g., video, audio, or a combination thereof). The communication characteristics may be logged in memory and may also be stored in table 1904 while a communication is on-going or at the conclusion of the communication.

Characteristics of the video communications in table 1904 include listing the name, host, participants, meeting duration, meeting transcript, meeting scheduled duration, meeting recording, and meeting Join URL. Active Link 1924 is a functioning hyperlink where users may click to join a scheduled Zoom Meeting (video communication). For example, item 1914 relating to characteristics of a "Fall Review" communication lists characteristics including a specific host, two participants, duration of 34 minutes, a meeting transcript, a scheduled duration of 30 minutes, a recording link, and no join URL active link (because the meeting has already taken place). Additionally, item 1922 relating to characteristics of a "Zoom Meeting" communication lists characteristics of the video communication including a specific host, two participants (as of the time of the presentation of table 1904 in FIG. 19), duration of 'to be determined,' no meeting transcript (because the meeting has live and not completed), a scheduled duration of 60 minutes, no recording link (because the meeting has not been completed), and Active Link 1924 (because the meeting participants may still join the video communication). In some embodiments, item 1922 relates to video communication in video communication interface 1901 which is currently taking place. Metadata from "participants list" 1902 and "chat" 1903 of video communication 1901 may be used to log in memory, characteristics of the communication in table 1904 in real-time or once the communication is completed.

Figure 20:
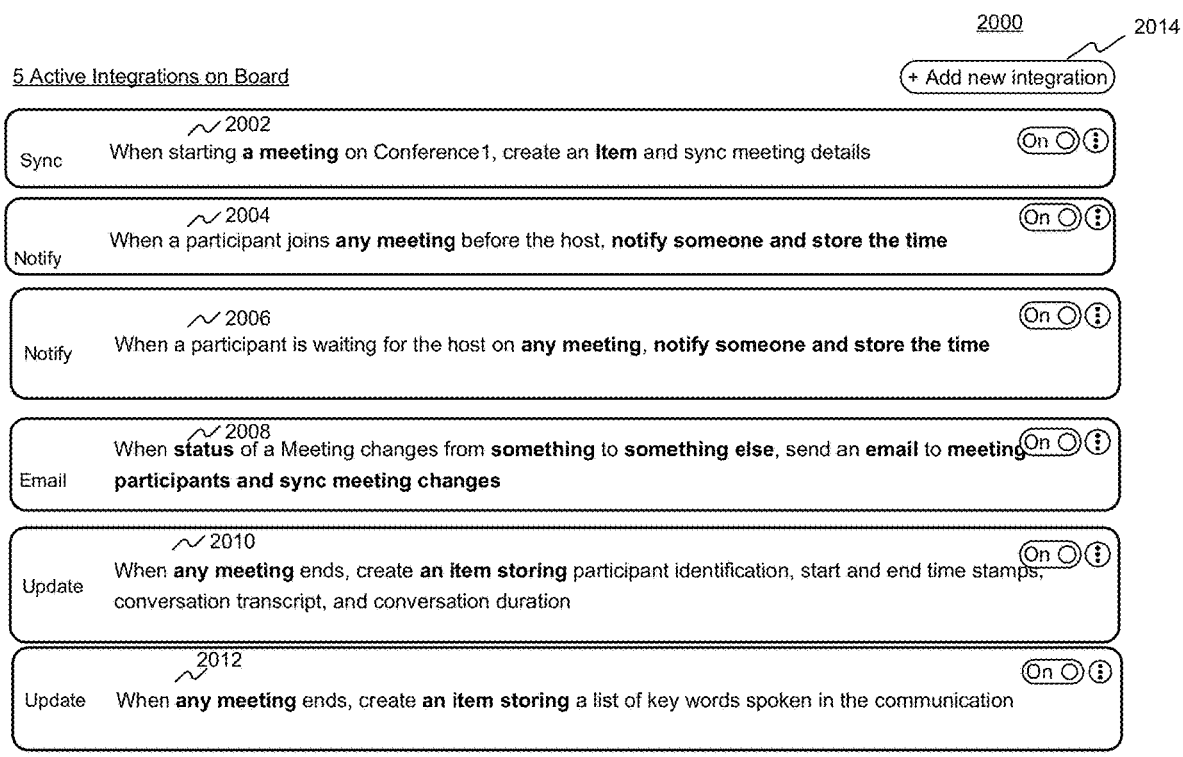
FIG. 20 illustrates an example of an interface with six active communications rules which define the characteristics of communications that are stored, consistent with some embodiments of the present disclosure.

By way of one example, FIG. 20 illustrates interface 2000 with six active communications rules which define the characteristics of communications that are stored in memory. Specifically, communications rule 2002 recites, "When starting a meeting on Microsoft Teams, create an Item and sync meeting details"; communications rule 2004 recites, "When a participant joins any meeting before the host, notify someone and store the time"; communications rule 2006 recites, "When a participant is waiting for the host on any meeting, notify someone and store the time"; communications rule 2008 recites, "When status of a Meeting changes from something to something else, send an email to meeting participants and sync meeting changes"; communications rule 2010 recites, "When any meeting ends, create an item storing participant identification, start and end time stamps, conversation transcript, and conversation duration"; and communications rule 2012 recites, "When any meeting ends, create an item storing a list of key words spoken in the communication." Using each of the communications rules displayed in FIG. 20, the system may pull all data (metadata or characteristics of the communication), log the data memory, and generate an object associated with the table to display the collected data from the communication.

In some embodiments, a system may log in memory any information retrievable from metadata of a video communication. Once all the data is pulled in and stored on the board, the data may be used in many other ways by the user. For example, the data may be migrated to other boards, the user may set up different ways to view the data, and the user may analyze the data for any purpose.

In some embodiments, if the video communication includes one or more breakout rooms, the system may generate one or more subitems for each breakout room in the table providing any characteristics of the communication (e.g., show who was in each breakout room and for what duration).

Aspects of this disclosure may involve characteristics of a communication further including at least one participant identification, start and end time stamps, a conversation transcript, a conversation duration, a list of key words spoken in the communication, or statistics related to participants. Participant identification may include any identifying information of people (such as name, image, or email address). Start and end time stamps may include start and end time indicators of a meeting (e.g., graphical or numerical or a combination thereof) or timestamps associated with someone joining meeting and leaving meeting. A conversation transcript may include an audio recording or video recording of the meeting, transcription of the audio, or the chat entries during the communication. A conversation duration may include the length of time of the communication or the length of times each participant participated in the communication. A list of key words spoken in the communication may obtained via speech recognition software, such as a speech to text API, or any other suitable mechanism for deriving text from speech. The list of key words may include a directory of each of the words used during the call based on frequency used per person or per call. Key words may be determined by a system look up in the directory or may be manually marked by participants during the communication such as through a bookmark or flag. Statistics related to participants may include any figures, data, numbers, or facts related to the people who joined the communication and their activities during the communication (e.g., number of messages sent, frequency of key words used, number of files transmitted, and more).

Aspects of this disclosure may include generating an object associated with a table, the object containing the characteristics of a communication logged in memory. Generating an object may include creating a new cell, row, column, table, dashboard, or any other locus that may store the data or presentation of data, as discussed further below. The object may contain the characteristics of the communication consistent with some disclosed embodiments discussed above. For example, an object associated with the table may include an icon in an existing row or a cell.

By way of one example, item 1922 of FIG. 19 includes eight objects (eight cells in the row) relating to characteristics of a Zoom Meeting communication. The eight objects include meeting name, meeting host, meeting participants, meeting duration, meeting transcript, meeting scheduled duration, meeting recording, and meeting Join URL. Each of the cells specifically list characteristics of the video communication associated with it.

In some embodiments, generating an object associated with a table may include creating a row in the table associated with the communication. In some embodiments, the system may generate a new row associated with the communication.

FIG. 19 illustrated a system that generated item 1906, item 1908, item 1910, item 1912, item 1914, item 1916, item 1918, item 1920, and item 1922 as new rows in table 1904 associated with one or more communications. While these items may be generated as new rows in an existing table, these items may also have been generated in a new table. Further, the generation of new items may occur for a first user with a first board, or may be generated for multiple users (e.g., teammates associated with a communication) as discussed below.

In some embodiments, generating an object associated with a table may include creating a row in another table associated with the communication. In some embodiments, a system may create one or more rows in another table (of multiple tables) associated with the communication. The additional table may be for a single user or may be generated for multiple users who may or may not have participated in the communication. For example, where a communication involves a team of four individuals and a supervisor, the generated object that my contain characteristics of the communication as a new row containing that information in a table for each of the four individuals and the supervisor. Even if one of the individuals could not attend the communication, that particular individual may still have an object generated to capture the characteristics and communications from the meeting.

In some embodiments, the generated object may be associated with a particular row. Linking a generated object to a row may include associating or connecting an object and an item or row, consistent with some embodiments disclosed above. While the generated object may be associated with a particular row, the generated object may be associated with a particular cell. The generated object may be associated with the particular cell containing an active link, as previously discussed.

In FIG. 19, an exemplary generated object may be associated with a specific cell such as the cell item 1922 that includes Active Link 1924.

Aspects of this disclosure may also involve logging text messages occurring between participants during a communication and generating an object that may include characterizing the logged text messages. Text messages may include any alphanumeric of graphical communications transmitted or saved during a video or audio (e.g., a resulting transcript of an audio conversation) communication. Characterizing logged text messages may include analyzing data associated with the text messages or analyzing the text messages themselves, consistent with some embodiments discussed above. Characterizing the logged text messages may include recording a number of text messages exchanged. In some embodiments, the system may analyze the meta data associated with the video communication including the chat messages in order to determine tallies of the communications sent by particular participants.

In FIG. 19, the system displays logged chat messages from video communication 1901 in table 1904. While not shown, the system may log characteristics of the communications in memory that may be later retrieved and viewed. For example, a user associated with table 1904 may add a new column that presents additional characteristics of the logged text messages at a time after the text messages were sent. Upon adding the new column, the table 1904 may present the characteristics of the text message or other communications and files that were transmitted during the video/audio communication.

According to some embodiments of this disclosure, characterizing text messages may include recording key words from the text messages. In some embodiments, the system may analyze the logged chat messages from a communication and determine key words or phrases spoken by each individual or all individuals during the video or audio communication. This may enable users to track action items at the conclusion of the communication. In some other embodiments, the system may enable participants to manually mark key words from the communication or text messages for recordation so that the participants may later refer to the key words.

Figure 21:
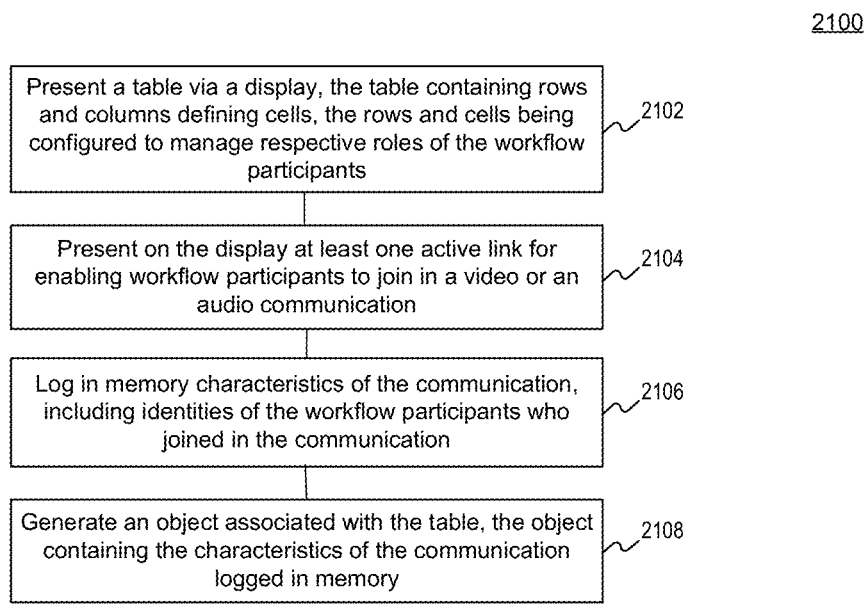
FIG. 21 illustrates a block diagram of method 2100 performed by a processor of a computer readable medium containing instructions, consistent with some embodiments of the present disclosure.

FIG. 21 illustrates a block diagram of method 2100 performed by a processor of a computer readable medium containing instructions, consistent with some disclosed embodiments. In some embodiments, the method may include the following steps:

Block 2102: Present a table via a display, the table containing rows and columns defining cells, the rows and cells being configured to manage respective roles of the workflow participants. In some embodiments, a user may access a data management platform and view tables with rows, columns, and cells to manage data.

Block 2104: Present on the display at least one active link for enabling workflow participants to join in a video or an audio communication. In some embodiments, the table may include a functioning hyperlink to allow users to join a videocall.

Block 2106: Log in memory characteristics of the communication, including identities of the workflow participants who joined in the communication. In some embodiments, the system may store any metadata associated with the video call and its participants.

Block 2108: Generate an object associated with the table, the object containing the characteristics of the communication logged in memory. In some embodiments, the system may display the stored metadata associated with the video call and its participants on a table of the data management platform.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

The terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following bullet-pointed features alone or in combination with one or more other bullet-pointed features, whether implemented as a method, by at least one processor, and/or stored as executable instructions on non-transitory computer-readable media:

maintaining the plurality of distinct tables;

wherein each distinct table contains a plurality of items, with each item being made up of a plurality of cells categorized by category indicators;

wherein the plurality of distinct tables contain a common category indicator;

generating a graphical representation of a plurality of variables within the plurality of cells associated with the common category indicator, the graphical representation including a plurality of sub-portions, each sub-portion representing a differing variable of the common category indicator;

receiving a selection of a sub-portion of the graphical representation;

performing a look-up across the plurality of distinct tables for a specific variable associated with the received selection;

based on the look-up, causing an aggregated display of a plurality of items dissociated from the differing tables;

wherein each displayed item includes the specific variable and variables associated with additional category indicators;

wherein the aggregated display includes a new table different from each of the distinct tables;

receiving a sub-selection of the plurality of distinct tables for exclusion from the aggregated display;

wherein following the received sub-selection, the aggregated display is caused to change to omit items from the excluded tables;

receiving selections of multiple sub-portions of the graphical display and to perform a look-up across the plurality of distinct tables for specific variables associated with the received selections;

storing the selections as a template;

receiving a selection to alter one of the plurality of items of the aggregated display;

in response to the selection to alter one of the plurality of items, outputting a display signal to re-render the aggregated display of the plurality of items;

wherein the aggregated display includes a graphical indicator based on a percentage makeup of a characteristic of the plurality of items;

accessing a first platform that displays a first set of data in a first format;

accessing a second platform that displays a second set of data in a second format;

linking the first set of data with the second set of data to enable migration of the first set of data to the second platform and the second set of data to the first platform;

enabling the first platform to simultaneously display the second set of data in the second format;

enabling alteration of the second set of data in the second platform through manipulation of the simultaneous display of the second set of data in the first platform;

in response to receiving an alteration, syncing the second set of data as altered via the first platform with the first data set;

wherein linking the first set of data with the second set of data includes mapping a data type from the first set of data to a data type from second set of data;

wherein enabling the first platform to simultaneously display the second set of data in the second format includes providing a frame within the first platform in which the second platform is displayed;

wherein the frame is an iframe;

wherein enabling alteration of the second set of data in the second platform through manipulation of the simultaneous display of the second set of data in the first platform includes enabling editing within the frame;

while the second platform is simultaneously displayed, exporting changes made to the first set of data to the second platform such that the simultaneous display of the second set of data is updated in real time;

wherein linking the first set of data with the second set of data occurs as a result of an input to a logical sentence structure;

in response to receipt of the input, to regulate the syncing of the second data set with the first data set;

presenting a table via a display, the table containing rows and columns defining cells, the rows and cells being configured to manage respective roles of the workflow participants;

presenting on the display at least one active link for enabling workflow participants to join in a video or an audio communication;

logging in memory, characteristics of the communication including identities of the workflow participants who joined in the communication;

generating an object associated with the table, the object containing the characteristics of the communication logged in memory;

wherein the table is configured to track due dates and statuses of items associated with the workflow;

wherein the at least one processor is configured to associate the communication with a specific one of the items and to link the object to the specific one of the items;

wherein the at least one active link is associated with a particular row in the table;

wherein the generated object is associated with the particular row;

wherein active link is associated with a particular cell in the table;

wherein the generated object is associated with the particular cell;

wherein the video or audio communication is provided via an application linked via the active link;

wherein the characteristics of the communication further include at least one participant identification, start and end time stamps, a conversation transcript, a conversation duration, a list of key words spoken in the communication, or statistics related to participants;

wherein generating the object associated with the table includes creating a row in the table associated with the communication;

wherein generating the object associated with the table includes creating a row in another table associated with the communication;

logging text messages occurring between participants during the communication and wherein generating the object includes characterizing the logged text messages;

wherein characterizing the logged text messages includes recording a number of text messages exchanged;

wherein characterizing the text messages includes recording key words from the text messages.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A workflow management system for triggering table entries characterizing workflow-related communications occurring between workflow participants, the system comprising:

at least one processor configured to:
maintain in a data structure information for populating a table, wherein the data structure is accessible to at least one network device, and wherein the table contains rows and columns defining cells, the rows and cells being configured to display characteristics of at least two video or audio communications;
present the table via a display, wherein the display is associated with the at least one network device;
present an interface via the display, wherein the interface enables configuration of a communications rule defining a condition that when satisfied generates an object associated with the table, the interface including at least one user-selectable prompt to associate the communications rule with one or more particular cells of the table, wherein the object contains characteristics of a specific video or audio communication;
receive a definition of the communications rule to configure the communications rule;
apply the configured communications rule to the table;
present on the display at least one active link for enabling workflow participants to join in the specific video or audio communication;
log in memory, the characteristics of the specific video or audio communication;
detect the condition of the configured communications rule is satisfied; and
in response to detecting the satisfied condition, generate the object associated with the table in accordance with the configured communications rule.

2. The system of claim 1, wherein the table is configured to track due dates and statuses of items associated with a workflow, and wherein the at least one processor is configured to associate the specific video or audio communication with a specific one of the items and to link the object to the specific one of the items.

3. The system of claim 1, wherein the at least one active link is associated with a particular row in the table.

4. The system of claim 3, wherein the generated object is associated with the particular row.

5. The system of claim 3, wherein the at least one active link, when activated, provides the specific video or audio communication via a third-party application.

6. The system of claim 5, wherein the at least one processor is further configured to link data contained in the particular row with data from the third-party application to enable syncing of the data contained in the particular row to the third-party application and the data from the third-party application to the particular row, and wherein the data from the third-party application includes the characteristics of the specific video or audio communication.

7. The system of claim 6, wherein the at least one processor is further configured to sync data contained in the particular row to the third-party application in response to activating the at least one active link.

8. The system of claim 6, wherein the at least one processor is further configured to sync, from the third-party application, the characteristics of the specific video or audio communication, and wherein generating the object associated with the table includes populating the particular row with the synced characteristics of the specific video or audio communication.

9. The system of claim 1, wherein the at least one active link is associated with a particular cell in the table.

10. The system of claim 9, wherein the generated object is associated with the particular cell.

11. The system of claim 1, wherein the specific video or audio communication is provided via an application linked via the at least one active link.

12. The system of claim 1, wherein the characteristics of the specific video or audio communication include at least one characteristic selected from a group consisting of start and stop stamps, identities of the workflow participants associated with the specific video or audio communication, a conversation duration, a list of key words spoken in the specific video or audio communication, a conversation transcript, and statistics related to participants.

13. The system of claim 12, wherein the identities of the workflow participants associated with the specific video or audio communication include:
   individuals or entities invited to participate in the specific video or audio communication;
   individuals or entities who participated in the specific video or audio communication; or
   a host of the specific video or audio communication.

14. The system of claim 1, wherein generating the object associated with the table includes creating a row in the table associated with the specific video or audio communication.

15. The system of claim 1, wherein generating the object associated with the table includes creating a row in another table associated with the specific video or audio communication.

16. The system of claim 1, wherein the at least one processor is further configured to log text messages occurring between participants during the specific video or audio communication and wherein generating the object includes characterizing the logged text messages.

17. The system of claim 16, wherein characterizing the logged text messages includes recording a number of text messages exchanged.

18. The system of claim 16, wherein characterizing the text messages includes recording key words from the text messages.

19. The system of claim 1, wherein the configured communications rule is constructed to generate, when the specific video or audio communication is scheduled, a new row in the table.

20. The system of claim 19, wherein the generated object is associated with the new row in the table.

21. The system of claim 1, wherein the condition is at least one condition selected from a group consisting of a scheduling of the specific video or audio communication, a beginning of the specific video or audio communication, and an ending of the specific video or audio communication.

22. The system of claim 1, wherein the interface includes pickable options to define variable fields associated with the communications rule.

23. A non-transitory computer readable medium containing instructions that when executed by at least one processor, cause the at least one processor to perform operations for triggering table entries characterizing workflow-related communications occurring between workflow participants, the operations comprising:
   maintaining in a data structure information for populating a table, wherein the data structure is accessible to at least one network device, and wherein the table contains rows and columns defining cells, the rows and cells being configured to display characteristics of at least two video or audio communications;
   presenting the table via a display, wherein the display is associated with the at least one network device;
   presenting an interface via the display, wherein the interface enables configuration of a communications rule defining a condition that when satisfied generates an object associated with the table, the interface including at least one user-selectable prompt to associate the communications rule with one or more particular cells of the table, wherein the object contains characteristics of a specific video or audio communication;
   receiving a definition of the communications rule to configure the communications rule;
   applying the configured communications rule to the table;
   presenting on the display at least one active link for enabling workflow participants to join in the specific video or audio communication;
   logging in memory, the characteristics of the specific video or audio communication;
   detecting the condition of the configured communications rule is satisfied; and
   in response to detecting the satisfied condition, generating an object associated with the table in accordance with the configured communications rule.

24. The non-transitory computer readable medium of claim 23, wherein the at least one active link is associated with a particular row in the table, and wherein the generated object is associated with the particular row.

25. The non-transitory computer readable medium of claim 23, wherein the at least one active link is associated with a particular cell in the table, and wherein the generated object is associated with the particular cell.

26. The non-transitory computer readable medium of claim 23, wherein the specific video or audio communication is provided via an application linked via the at least one active link.

27. The non-transitory computer readable medium of claim 23, wherein the characteristics of the specific video or audio communication include at least one characteristic selected from a group consisting of start and stop stamps, identities of the workflow participants associated with the specific video or audio communication, a conversation duration, a list of key words spoken in the specific video or audio communication, a conversation transcript, and statistics related to participants.

28. The non-transitory computer readable medium of claim 23, wherein the operations further comprise logging text messages occurring between participants during the specific video or audio communication and wherein generating the object includes characterizing the logged text messages.

29. A method for triggering table entries characterizing workflow-related communications occurring between workflow participants, the method comprising:
   maintaining in a data structure information for populating a table, wherein the data structure is accessible to at least one network device, and wherein the table contains rows and columns defining cells, the rows and cells being configured to display characteristics of at least two video or audio communications;
   presenting the table via a display, wherein the display is associated with the at least one network device;
   presenting an interface via the display, wherein the interface enables configuration of a communications rule defining a condition that when satisfied generates an object associated with the table, the interface including at least one user-selectable prompt to associate the communications rule with one or more particular cells of the table, wherein the object contains characteristics of a specific video or audio communication;
   receiving a definition of the communications rule to configure the communications rule;
   applying the configured communications rule to the table;
   presenting on the display at least one active link for enabling workflow participants to join in the specific video or audio communication;
   logging in memory, the characteristics of the specific video or audio communication;
   detecting the condition of the configured communications rule is satisfied; and
   in response to detecting the satisfied condition, generating an object associated with the table in accordance with the configured communications rule.

30. The method of claim 29, wherein the characteristics of the specific video or audio communication include at least one characteristic selected from a group consisting of start and stop stamps, identities of the workflow participants associated with the specific video or audio communication, a conversation duration, a list of key words spoken in the specific video or audio communication, a conversation transcript, and statistics related to participants.

* * * * *